(12) United States Patent
Spinner et al.

(10) Patent No.: US 7,100,398 B2
(45) Date of Patent: Sep. 5, 2006

(54) INSTALLATION AND METHOD FOR PRODUCING COLD OR HEAT USING A SORPTION SYSTEM

(75) Inventors: Bernard Spinner, Perpignan (FR); Jalel Labidi, Perpignan (FR); Driss Stitou, Saint Nazaire (FR)

(73) Assignee: Centre National de la Recherche Scientifiqe, Paris (FR)

( * ) Notice: Subject to any disclaimer, the term of this patent is extended or adjusted under 35 U.S.C. 154(b) by 323 days.

(21) Appl. No.: 10/491,627

(22) PCT Filed: Oct. 1, 2002

(86) PCT No.: PCT/FR02/03340

§ 371 (c)(1),
(2), (4) Date: Apr. 2, 2004

(87) PCT Pub. No.: WO03/029732

PCT Pub. Date: Apr. 10, 2003

(65) Prior Publication Data

US 2004/0211205 A1      Oct. 28, 2004

(30) Foreign Application Priority Data

Oct. 3, 2001    (FR) .................................. 01 12715

(51) Int. Cl.
*F25B 15/00*     (2006.01)
*F25B 17/08*     (2006.01)

(52) U.S. Cl. ......................................... 62/476; 62/480

(58) Field of Classification Search .................. 62/476, 62/480
See application file for complete search history.

(56) References Cited

U.S. PATENT DOCUMENTS

| 4,523,635 A | 6/1985 | Nishizaki et al. |
| 4,623,018 A | 11/1986 | Takeshita et al. |
| 5,174,367 A | 12/1992 | Nasako et al. |
| 5,351,493 A | 10/1994 | Hiro et al. |

FOREIGN PATENT DOCUMENTS

| DE | 44 38 427 A1 | 5/1996 |
| FR | 725959 | 5/1932 |

OTHER PUBLICATIONS

Search Report issued in International Application No. PCT/FR02/03340.

*Primary Examiner*—William Doerrler
*Assistant Examiner*—B. Clayton McCraw
(74) *Attorney, Agent, or Firm*—Buchanan Ingersoll& Rooney PC

(57) ABSTRACT

A method and installation is described for producing cold and/or heat, in a place where the latter are to be used, from one or more heat energy sources. The method is carried out in an installation comprising two or three assemblies of two reactors in which reversible phenomena involving a gas take place, said phenomena being exothermic in the sense of synthesis and endothermic in the sense of decomposition. The energy for the operation of the installation is supplied by a low temperature reactor of one or two assemblies. The installation is suitable for the remote production of cold or heat by means of the transport of gas at ambient temperature.

23 Claims, 13 Drawing Sheets

INSTALLATION AND METHOD FOR PRODUCING COLD OR HEAT USING A SORPTION SYSTEM

BACKGROUND OF THE INVENTION

1. Field of the Invention

The present invention relates to an installation and a method for producing cold and/or heat by a sorption system.

2. Description of the Related Art

When the production of energy is not located near the place where the energy is required, it is necessary to provide for transport means. The most widespread energy transport means are the electricity distribution grids. It is nonetheless well-known on the one hand that the conversion efficiency of a primary energy into electricity barely exceeds 50%, and that furthermore, the transport of the electricity is accompanied by losses of about 15%. It is also known how to transport energy in thermal form for the distribution of cold or heat, particularly in urban or industrial networks, using heat transfer fluids (such as water or steam for example) which exchange heat with the medium to be heated or to be cooled. In most cases, these types of exchange involve an exchange of sensible heat or latent heat, which causes the recirculation of large fluid flows and consequently heat losses associated with the high or low temperature of the heat transfer fluid, as well as a high consumption of pumping energy.

Installations for producing heat or cold are known based on thermochemical systems, which employ reversible processes between a gas, called the working gas, and a liquid or a solid. In these systems, the combination step between the gas and the liquid or the solid (absorption of the gas by the liquid, adsorption of the gas on the solid, reaction between the gas and the solid) is exothermic, and the reverse step is endothermic. A large number of reactors and methods based on these principles have been described. They are described in particular in U.S. Pat. No. 4,531,374 (Alefeld) which describes many variants of a device for producing cold or heat based on reversible reactions. These devices operate by reversible absorption of a working gas by a liquid in two working gas circulation circuits operating at two or three pressure levels. Owing to the various operating modes described, the use of such a reactor requires the circulation of the liquid absorbent between one of the reactors of one of the working gas circulation circuits and one of the reactors of the other circuit. This circulation of large quantities of liquid demands pumping means which consume non-negligible quantities of energy, and considerable insulation means to prevent heat losses during the transport of the liquid. The energy supplied to the device during a complete operating cycle is added sometimes to the evaporator supplying the working gas, sometimes to the reactor containing the liquid enriched in gas, in order to liberate the gas, said input therefore taking place at temperatures higher than the gas evaporation temperature and consequently incurring a higher cost. Furthermore, U.S. Pat. No. 4,523,635 and U.S. Pat. No. 4,623,018 describe systems which operate by reversible insertion of hydrogen in hydrides. The systems comprise at least two operating units each consisting of two reactors containing a hydride and connected by a pipe for circulating hydrogen. According to U.S. Pat. No. 4,523,635, during an operating cycle, hydrogen is liberated from a first hydride by adding heat at high temperature to the reactor of one operating unit which contains the hydride whereof the equilibrium temperature is the higher. In the operating mode described in U.S. Pat. No. 4,623,018, each cycle includes at least one step during which heat is added by an external source to a "high temperature" reactor of one of the operating units.

SUMMARY OF THE INVENTION

The present invention is aimed at supplying a method and an installation for producing cold and/or heat at their place of use, using one or a plurality of thermal energy sources, thereby avoiding the transportation of liquid or solid material, and by supplying the energy necessary for the operation of the installation at a relatively low temperature.

An installation for producing cold and/or heat according to the present invention comprises an HP assembly comprising reactors $R_1$ and $R'_1$, an LP assembly comprising reactors $R_3$ and $R'_3$ and possibly an IP assembly comprising reactors $R_2$ and $R'_2$. In the rest of the text, $R_i$ denotes any one of the reactors $R_1, R_2$ and $R_3$, and $R'_i$ denotes any one of the reactors $R'_1, R'_2$ and $R'_3$. The installation is characterized in that:

each reactor $R_i$ is the seat of a reversible sorption alternatively producing and consuming the gas $G_i$, each reactor $R'_i$ is the seat of a reversible process alternatively producing and consuming the gas $G_i$, the reactants in the reactors are selected so that, at a given pressure: the sorption equilibrium temperature in the reactor $R_i$ of an assembly is higher than the equilibrium temperature of the reversible process in the reactor $R'_i$ of the same assembly, the sorption equilibrium temperature in the reactor $R_1$ is lower than that in $R_3$, and, if applicable, the sorption equilibrium temperature in $R_2$ is between the equilibrium temperatures in $R_1$ and $R_3$, the reactors $R_i$ and $R'_i$ of an assembly are equipped with means for exchanging the gas $G_i$, the reactors $R_i$ are equipped with means for exchanging heat with each other, the reactors are isolated from atmospheric pressure.

A Clapeyron diagram shows the equilibrium curve (pressure P, temperature T) of a reversible process, generally in the form $\ln P = f(-1/T)$. The theoretical equilibrium curve is a line for a monovariant process such as a chemical reaction or a liquid/gas phase change. The equilibrium curve is a network of isosteres for the bivariant processes such as the adsorption of a gas on a solid or the absorption of a gas in a liquid, because the equilibrium point varies as a function of the concentration of gas in the solid or the liquid. Owing to the representation used, a curve corresponding to a given reversible process situated further to the left in a Clapeyron diagram means that, at a given pressure, the transformation temperature is lower than that of a reversible process whereof the equilibrium curve is situated further to the right in the diagram. In a given assembly of the installation of the invention, the temperature in the reactor $R'_i$ is consequently lower than the temperature in the reactor $R_i$ when the two reactors are caused to communicate by opening the gas transfer means, that is, when the reactors are at the same pressure.

In an installation according to the invention, the reactors $R_1, R'_1$ of the HP assembly consequently operate in a range of (pressure, temperature) $(PT)_1$ located at a roughly higher level than the range $(PT)_3$ of the LP assembly. The IP assembly, when the installation comprises three assemblies, operates in a range $(PT)_2$ intermediate between $(PT)_1$ and $(PT)_3$.

The reversible processes in the reactors $R'_i$ can be selected among the liquid/gas phase changes and among the reversible sorptions such as reversible chemical reactions, adsorptions of a gas on a solid, absorptions of a gas by a liquid, the formation of clathrate hydrates.

Each reactor $R_i$ is the seat of a reversible sorption such as a chemical reaction, an adsorption of a gas by a solid, an absorption of a gas by a liquid, or the formation of clathrate hydrates.

A liquid/gas phase change $Li \leftrightarrows G_i$ is exothermic in the condensation direction and endothermic in the evaporation direction. A reversible sorption between a liquid or solid sorbent and a gas, which can be written $Bi+G_i \leftrightarrows (Bi,G_i)$, is exothermic in the sorption direction $S_i$ and endothermic in the desorption direction $D_i$.

Numerous combinations are possible based on these reversible processes, and they serve to reach desired temperatures for producing useful cold or useful heat.

For example, in the installations comprising two HP and LP assemblies, an identical reversible process or different processes can be used in the reactors $R'_i$. If the processes in the two reactors $R'_i$ liberate the same gas, the sorbents in the reactors $R_i$ must be different. If the processes in the reactors R'i liberate different gases, the sorbents in the reactors $R_i$ may be identical or different.

Similarly, in the installations comprising three HP, LP and IP assemblies, reversible processes liberating the same gas G or liberating different gases $G_i$ can be used in the reactors $R'_i$. The reactors $R_i$ associated with reactors $R'_i$ which liberate the same gas must contain different sorbents. When the reactors $R'_i$ liberate different gases, the reactors $R_i$ associated with them may contain identical or different sorbents.

In a specific embodiment, the reactors $R'_i$ are the seat of a liquid/gas phase change liberating the same gas and each reactor $R_i$ is the seat of a reversible sorption between said gas and a different liquid or solid.

In another embodiment, each reactor $R'_i$ is the seat of a liquid/gas phase change producing a different gas and each reactor is the seat of a sorption involving a different solid or liquid.

The method according to the present invention for producing cold and/or heat in a given place comprises a succession of reversible processes between a gas and a liquid or a solid. It is characterized in that:

it is put into practice in an installation which comprises an HP assembly comprising reactors $R_1$ and $R'_1$, an LP assembly comprising reactors $R_3$ and $R'_3$ and possibly an IP assembly comprising reactors $R_2$ and $R'_2$, in which installation:

each reactor $R_i$ is the seat of a reversible sorption alternatively producing and consuming the gas $G_i$, each reactor $R'_i$ is the seat of a reversible process alternatively producing and consuming the gas $G_i$, the respective sorbents and gases in the reactors are selected so that, at a given pressure: the sorption equilibrium temperature in the reactor $R_i$ of an assembly is higher than the equilibrium temperature of the reversible process in the reactor $R'_i$ of the same assembly, the sorption equilibrium temperature in the reactor $R_1$ is lower than that in $R_3$, and, if applicable, the sorption equilibrium temperature in $R_2$ is between the equilibrium temperatures in $R_1$ and $R_3$, the reactors $R_i$ and $R'_i$ of an assembly are equipped with means for exchanging the gas $G_i$, the reactors $R_i$ are equipped with means for exchanging heat with each other, the reactors are isolated from atmospheric pressure, the thermal energy sources necessary for the operation of the installation supply the reactors $R'_i$.

More specifically, the method for producing cold or heat according to the invention comprises:

a preliminary step in which the gas exchange means between two reactors of an assembly are closed and the respective sorbents and gases are placed at ordinary temperature in the reactors so that the reactor $R_1$ of the HP assembly contains the sorbent in a form rich in gas $(B1,G_1)$, the reactor $R'_1$ is in a state to consume the gas $G_1$, the reactor $R_3$ of the LP assembly contains the sorbent in a form poor in gas B3 and the corresponding reactor $R'_3$ is in a state to supply gas $G_3$, a step a) of the production of cold and or heat, during which the gas exchange means are opened between the reactors $R_3$ and $R'_3$ on the one hand, the reactors $R_1$ and $R'_1$, and if applicable between the reactors $R_2$ and $R'_2$, possibly after having raised the reactor $R'_3$ and if applicable $R'_2$ to a temperature higher than the normal temperature by the input of heat energy, a step b) of regeneration during which the gas exchange means are opened between the reactors $R_3$ and $R'_3$ on the one hand, the reactors $R_1$ and $R'_1$, and if applicable between the reactors $R_2$ and $R'_2$, after having raised the reactor $R'_1$ and if applicable $R'_2$ to a temperature higher than the normal temperature by the input of heat energy.

At the end of the regeneration step, the installation is again in a state to produce cold or heat. It then suffices to close the gas exchange means between the reactors of the same level, to maintain the installation in this state as long as necessary. If it is again desired to produce cold or heat, it suffices to repeat step a) of production described here above, followed by the regeneration step b), and so forth as required.

In a specific embodiment, essentially aimed to produce cold, the method of the invention is characterized in that:

the respective gases and sorbents in the LP assembly (or the LP and IP assemblies) are selected so that, at the respective pressure which occurs in $R'_3$ (or in $R'_3$ and $R'_2$) after opening the gas exchange means in the reactors, the equilibrium temperature of the reversible process in $R'_3$ (or in $R'_3$ and in $R'_2$) corresponds to the temperature at which the production of cold is desired, during step a) of production, the gas exchange means are opened between the reactors without a prior input of heat energy to the reactor $R'_3$ (or to the reactors $R'_3$ and $R'_2$).

In an installation according to the invention used to produce cold, the cold production temperature is determined by the temperature at which the gas $G_i$ is liberated in the reactor $R'_i$ of the LP assembly or of the LP and IP assemblies which are in the lowest ranges of (pressure, temperature). The reversible processes in the two reactors of an LP assembly (and possibly of the IP assembly) are selected so that the simple communication of the reactors $R_i$ and $R'_i$ of the same assembly causes the spontaneous endothermic liberation of the gas $G_i$ in $R'_i$ and the sorption phase in $R_i$, with the withdrawal of the heat energy necessary from the ambient medium, that is the production of cold at the level of $R'_i$. The spontaneous withdrawal of heat energy from the ambient medium results in the production of cold in the reactor $R'_3$ and if applicable in the reactor $R'_2$ during step a). Then, to regenerate the installation during step b), heat energy is added via the reactor $R'_i$ of the assembly having the highest range (pressure temperature), and possibly of the assembly having the intermediate range (pressure, temperature), before opening the gas exchange means between the reactors $R_i$ and $R'_i$. Simultaneously, the installation restores heat energy during each of the steps, to the reactors $R'_i$ which are not involved by the introduction of energy and which are accordingly at intermediate temperatures between the low cold production temperatures and the high regeneration temperatures of the installation. If these intermediate temperatures are useful temperatures, the installation can be used to produce cold and heat simultaneously.

In an installation according to the invention comprising two HP and LP assemblies, the cold is produced at the temperature at which the gas is liberated in the reactor $R'_3$ of the LP assembly. The method is put into practice in the following conditions:

during a preliminary step,
  the gas transfer means between $R_1$ and $R'_1$ on the one hand, between $R_3$ and $R'_3$ on the other are closed,
  the respective sorbents and gases are introduced into the reactors so that the reactor $R_1$ of the HP assembly contains the sorbent in a form rich in gas (B1,$G_2$), the reactor $R'_1$ is in a state to consume the gas $G_1$, the reactor $R_3$ of the LP assembly contains the sorbent in a form poor in gas B3 and the corresponding reactor $R'_3$ is in a state to supply gas $G_3$,
  the respective gases and sorbents in the LP assembly are selected so that, at the respective pressure which occurs in $R'_3$ after opening the gas exchange means, the equilibrium temperature of the reversible process in $R'_3$ corresponds to the temperature at which the production of cold is desired;

during step a) which is the cold production step, the gas transfer means are opened between the reactors $R_3$ and $R'_3$ on the one hand and between the reactors $R_1$ and $R'_1$ on the other, thereby causing the spontaneous liberation of gas $G_3$ in $R'_3$, the exothermic sorption of $G_3$ with the sorbent B3 in $R_3$, the endothermic desorption of the sorbent rich in gas (B1,$G_1$) in $R_1$, the exothermic consumption of the gas $G_1$ in $R'_1$;

during step b) which is the regeneration step, heat energy is added to $R'_1$ to raise it to a temperature higher than the ambient temperature, the gas transfer means are opened between the reactors $R_3$ and $R'_3$ on the one hand and between the reactors $R_1$ and $R'_1$ on the other, thereby causing the liberation of gas $G_1$ in $R'_1$, the exothermic sorption of $G_1$ with the sorbent B1 in $R_1$, the endothermic desorption of the sorbent rich in gas (B3,G3) in $R_3$, the exothermic consumption of the gas G3 in $R'_3$.

At the end of step b), the installation is again in a state to produce cold. It suffices to connect the reactors $R_3$ and $R'_3$ of the LP assembly. In such an installation, the cold is produced in $R'_3$ and regeneration is achieved by $R'_1$. Only the reactor $R'_3$, the seat of cold production, is necessarily located at the place where the production of cold is required. The reactor $R'_1$ supplied with heat energy during the regeneration of the installation is located at the place where the heat energy is available and the other reactors are located at any appropriate place, that is, at any distance from the place of cold production. It is therefore possible to produce cold in a given place from a heat energy source located elsewhere, by the simple circulation of gas at any temperature, without the transport of hot or cold liquid or solid. All the difficulties connected with the actual transport of solids or gases are thereby eliminated, as well as the heat losses.

The operation of an installation with two assemblies as described here above is similar, whether the respective gases $G_1$ and $G_3$ are identical or different.

In an installation comprising three assemblies, several cold production modes can be considered. The cold can be produced at two different temperatures during the same production cycle. The cold can be produced at a given temperature in two successive phases during the production step a). The cold can also be produced at a given temperature in a single phase during the step a), the regeneration step then taking place in two phases.

For the production of cold at two different temperatures, the method is put into practice in an installation which comprises three HP, LP and IP assemblies respectively comprising the reactors $R_1,R'_1$, $R_3,R'_3$ and $R_2,R'_2$, in the following conditions:

during a preliminary step,
  the gas exchange means are closed between the reactors $R_1,R'_1$, $R_3,R'_3$ and $R_2,R'_2$,
  the respective sorbents and gases are introduced into the reactors so that the reactor $R_1$ of the HP assembly contains the sorbent in a form rich in gas (B1,$G_1$), the reactor $R'_1$ is in a state to consume the gas $G_1$, the reactors $R_3$ and $R_2$ of the LP and IP assemblies contain their sorbent in a form poor in gas, respectively B3 and B2, and the reactors $R'_3$ and $R'_2$ are in a state to supply the respective gases $G_3$ and $G_2$,
  the respective gases and sorbents in the LP and IP assemblies are selected so that, at the respective pressures which occur in $R'_3$ and $R'_2$ after opening the gas exchange means, the equilibrium temperatures of the respective reversible processes in $R'_2$ and $R'_3$ correspond to the temperatures at which the production of cold is desired;

during step a) the gas exchange means are opened between the reactors $R_1,R'_1$, $R_3,R'_3$ and $R_2,R'_2$, thereby causing the spontaneous liberation of $G_3$ in $R'_3$ and of $G_2$ in $R'_2$, the exothermic sorption of $G_3$ with the sorbent B3 in $R_3$, the exothermic sorption of $G_2$ with the sorbent B2 in $R_2$, the endothermic desorption of the sorbent rich in gas (B1,$G_1$) in $R_1$, the exothermic consumption of the gas $G_1$ in $R'_1$;

during step b), heat energy is added to $R'_1$, the gas exchange means are then opened between the reactors $R_1,R'_1,R_3,R'_3$ and $R_2,R'_2$, thereby causing the liberation of gas $G_1$ in $R'_1$, the exothermic sorption of $G_1$ with the sorbent B1 in $R_1$, the endothermic desorption of the sorbent rich in gas (B3,$G_3$) in $R_3$, the exothermic consumption of the gas $G_3$ in $R'_3$, the endothermic desorption of the sorbent rich in gas (B2,2) in $R_2$, and the exothermic consumption of the gas G2 in $R'_2$.

During step a), the production of cold is observed in $R'_3$ and $R'_2$. During step b), the installation is regenerated by supplying heat energy to $R'_1$. Cold can thereby be produced by the simple circulation of gas at an ordinary temperature, at the place where $R'_3$ and $R'_2$ are located, the other portions of the installation and the heat source supplying $R'_1$ being situated elsewhere.

For the production of cold in two phases during the cold production step, the method is put into practice in an installation which comprises three HP, LP and IP assemblies respectively comprising the reactors $R_1,R'_1$, $R_3,R'_3$ and $R_2,R'_2$, in the following conditions:

during a preliminary step,
  the gas exchange means are closed between the reactors $R_1,R'_1$, $R_3,R'_3$ and $R_2,R'_2$,
  the respective sorbents and gases selected are introduced in the reactors so that the reactors $R_1$ and $R_2$ contain their respective sorbent in a form rich in gas (B1,$G_1$) and (B2,$G_2$), the reactors $R'_1$ and $R'_2$ are in a state to consume the respective gas $G_1$ and $G_2$, the reactor $R_3$ contains the sorbent in a form poor in gas B3, and the reactor $R'_3$ is in a state to supply the gas;

during step a) in a first phase, the gas exchange means are opened between the reactors $R_3$, $R'_3$ on the one hand and the reactors $R_2,R'_2$ on the other, thereby causing the spontaneous liberation of $G_3$ in $R'_3$ with the production of cold, the exothermic sorption of $G_3$ with the sorbent B3 in $R_3$, the endothermic desorption of the sorbent rich in gas (B2,$G_2$) in $R_2$, the exothermic consumption of $G_2$ in $R'_2$; in a second phase, the gas exchange means are opened between the reactors $R_1,R'_1$ on the one hand and the reactors $R_2,R'_2$ on the other, thereby causing the spontaneous liberation of $G_2$ in $R'_2$ with the production of cold, the exothermic sorption of $G_2$ with the sorbent B2 in $R_2$, the endothermic desorption of the sorbent rich in gas (B1,$G_1$) in $R_1$, the exothermic consumption of the gas $G_1$ in $R'_1$;

during step b), heat energy is added to $R'_1$ to raise it to a temperature higher than the normal temperature, the gas transfer means are then opened between the reactors $R_1,R'_1$ on the one hand and the reactors $R_3,R'_3$ on the other, thereby causing the liberation of gas $G_1$, the exothermic sorption of $G_1$ with the sorbent B1 in $R_1$, the endothermic desorption of the sorbent rich in gas (B3,$G_3$) in $R_3$, and the exothermic consumption of the gas $G_3$ in $R'_3$.

At the end of the step b), the installation is again in a state to produce cold. The simple contacting of $R'_3$ and $R_3$ serves to restart the process. In this specific case, the reactors $R'_3$ and $R'_2$ can be located at the same place or in different places, depending on whether cold is to be produced in one or two places, using a heat source supplying the reactor $R'_1$ located elsewhere. All or some of the gases may be identical in the installation. If the reactors $R'_3$ and $R'_2$ are the seat of the same reversible process involving the same gas, the cold is produced at the same temperature in the two phases of the production phase. This embodiment enables an increase in the cold production efficiency.

For the production of cold in a phase during the cold production step, the method is put into practice in an installation which comprises three HP, LP and IP assemblies respectively comprising the reactors $R_1,R'_1$, $R_3,R'_3$ and $R_2,R'_2$, in the following conditions:

during a preliminary step,
the gas exchange means are closed between the reactors $R_1,R'_1$, $R_3,R'_3$ and $R_2,R'_2$,
the respective sorbents and gases are introduced into the reactors $R_i$ and the reactors $R'_i$ and selected so that the reactors $R_1$ and $R_2$ contain their respective sorbent in a form rich in gas (B1,$G_1$) and (B2,$G_2$), the reactors $R'_1$ and $R'_2$ are in a state to consume the respective gas $G_1$ and $G_2$, the reactor $R_3$ contains the sorbent in a form poor in gas B3, and the reactor $R'_3$ is in a state to supply the gas;

during step a) the gas transfer means are opened between the reactors $R_3,R'_3$ on the one hand and the reactors $R_1,R'_1$ on the other, thereby causing the spontaneous liberation of $G_3$ in $R'_3$, the exothermic sorption of $G_3$ with the sorbent B3 in $R_3$, the endothermic desorption of the sorbent rich in gas (B1,$G_1$) in $R_1$, the exothermic consumption of the gas $G_1$ in $R'_1$;

during step b), in a first phase, heat energy is added to $R'_1$ and the reactors $R_1,R'_1$ on the one hand and the reactors $R_2,R'_2$ on the other are connected, thereby causing the spontaneous liberation of $G_1$, the exothermic sorption of $G_1$ with the sorbent B1 in $R_1$, the endothermic desorption of the sorbent rich in gas (B2,$G_2$) in $R_2$, and the exothermic consumption of the gas $G_2$ in $R'_2$; in a second phase, heat energy is added to $R'_2$, the reactors $R_2,R'_2$ on the one hand and the reactors $R_3,R'_3$ on the other are connected, thereby causing the liberation of gas $G_2$, the exothermic sorption of $G_2$ with the sorbent B2 in $R_2$, the endothermic desorption of the sorbent rich in gas (B3,$G_3$) in $R_3$, and the exothermic consumption of the gas $G_3$ in $R'_3$.

This embodiment, in which the cold is produced in the reactor $R'_3$ using energy sources supplying the reactors $R'_1$ and $R'_2$ placed elsewhere, serves to increase the cold production capacity.

It therefore appears that, in all the embodiments of the method of the invention for producing cold, the cold is produced in the reactor $R'_3$ in an installation with two assemblies which is regenerated by the input of heat to the reactor $R'_1$, or in the reactor $R'_3$ (or the reactors $R'_3$ and $R'_2$) in an installation with three assemblies which is regenerated by the input of heat in the reactors $R'_2$ and $R'_1$ (or in the reactor $R'_1$). In all cases, the heat source or sources used for the regeneration of the installation may be placed at a certain distance from the place where the cold is to be produced. Cold can thereby be produced at a given place, using an energy source placed elsewhere, by the simple transport of the working gas at ambient temperature. This characteristic, combined with the input of heat to the low temperature reactors of an assembly, therefore allows the remote production of cold and in a more economical manner than in the installations of the prior art.

In another embodiment, essentially aimed to produce heat at a given place of use, at a temperature higher than the temperature of a heat energy source, the method of the invention is characterized in that, during step a) of production, heat energy is added to the installation by the reactor $R'_3$, and possibly by the reactor $R'_2$, before opening the gas exchange means between the reactors $R_3$ and $R'_3$, and possibly between the reactors $R_2$ and $R'_2$.

In an installation according to the invention aimed to produce heat at a temperature higher than that of the energy source employed, during step a) of production, heat energy is supplied to the installation by the reactor $R'_3$ of the LP assembly or by the reactors $R'_3$ and $R'_2$ of the LP and IP assemblies, and heat is recovered in the reactor $R'_1$ of the HP assembly or by the reactors $R'_1$ and $R'_2$ of the HP and IP assemblies, that is, at the elevated operating temperature of the HP assembly and if applicable of the IP assembly. The temperature at which the heat is produced is determined by the temperature at which the gas $G_1$ is consumed in the reactor $R'_1$ and if applicable the temperature at which the gas $G_2$ is consumed in the reactor $R'_2$. In step b) of regeneration, the heat is supplied to the reactor $R'_1$ and if applicable to $R'_2$, at a temperature similar to that of the source of step a), and degraded heat is recovered in the reactor $R'_3$ and if applicable in $R'_2$. The temperature at which the heat is introduced into $R'_1$ and possibly into $R'_2$ in the regeneration step may be lower than the temperature at which the heat is introduced into $R'_3$ during the production step.

The heat Q produced at elevated temperature t in reactor $R'_1$ (and possibly $R'_2$) can be used for example in a heat exchanger or in a process requiring heat at said elevated temperature t. This use releases a certain quantity of heat Q' at a lower temperature to such that $Q'=Q[1-(t_0/t)]$ corresponding to the exergy of the heat Q. This heat Q' can advantageously be used in step b) to initiate the regeneration of the installation. In this particular embodiment of the method of the invention for producing heat, it is therefore unnecessary to dispose of a heat source external to the installation to regenerate the installation, and the heat can be produced at elevated temperature in $R'_1$ (or $R'_1$ and $R'_2$) using one or a plurality of heat sources available elsewhere at lower temperature.

For the production of heat at a given temperature, the method of the invention is put into practice in an installation which comprises an HP assembly comprising the reactors $R_1$ and $R'_1$ and an LP assembly comprising the reactors $R_3$ and $R'_3$, and it is characterized in that:

during a preliminary step:
- the gas transfer means between $R_1$ and $R'_1$ on the one hand, between $R_3$ and $R'_3$ on the other are closed,
- the respective sorbents and gases are introduced into the reactors so that the reactor $R_1$ of the HP assembly contains the sorbent in a form rich in gas $(B1,G_1)$, the reactor $R'_1$ is in a state to consume the gas $G_1$, the reactor $R_3$ of the LP assembly contains the sorbent in a form poor in gas $B3$ and the corresponding reactor $R'_3$ is in a state to supply gas $G_3$, during step a) of the production of heat, heat energy is added to $R'_3$ to raise it to a temperature higher than the normal temperature, the gas transfer means are then opened between the reactors $R_3$ and $R'_3$ on the one hand and the reactors $R_1$ and $R'_1$ on the other, thereby causing the spontaneous liberation of gas $G_3$ in $R'_3$, the exothermic sorption of $G_3$ with the sorbent $B3$ in $R_3$, the endothermic desorption of the sorbent rich in gas $(B1,G_1)$ in $R_1$, the exothermic consumption of the gas $G_1$ in $R'_1$ with the production of heat;

during step b), heat energy is added to $R'_1$ to raise it to a temperature higher than the normal temperature, the gas transfer means are then opened between the reactors $R_3$ and $R'_3$ on the one hand, and the reactors $R_1$ and $R'_1$, thereby causing the liberation of the gas $G_1$ in $R'_1$, the exothermic sorption of $G_1$ with the sorbent $B1$ in $R_1$, the endothermic desorption of the sorbent rich in gas $(B3,G3)$ in $R_3$, the exothermic consumption of the gas $G3$ in $R'_3$, and the regeneration of the installation.

In view of the respective equilibrium curves of the reversible processes employed in the different reactors, the heat energy introduced during step a) in $R'_3$ and during step b) in $R'_1$ is at an intermediate temperature between the temperature at which heat is recovered in $R'_1$ during step a), and the temperature at which the degraded heat is recovered in $R'_3$ during step b).

In a specific embodiment, the method of the invention can be put into practice to produce a quantity of heat at a given place at a temperature higher than that of two heat sources located at another place. In this case, the method of the invention is put into practice in an installation which comprises three HP, LP and IP assemblies, respectively comprising the reactors $R_1,R'_1$, $R_3,R'_3$ and $R_2,R'_2$, in the following conditions:

during a preliminary step,
- the gas exchange means are closed between the reactors $R_1,R'_1$, $R_3,R'_3$ and $R_2,R'_2$,
- the respective sorbents and gases selected are introduced into the reactors so that the reactor $R_1$ contains the sorbent in a form rich in gas $(B1,G_1)$, the reactor $R'_1$ is in a state to consume the gas $G_1$, the reactors $R_3$ and $R_2$ contain their respective sorbent in a form poor in gas $B3$ and $B2$, and the reactors $R'_3$ and $R'_2$ are in a state to supply the respective gas $G_3$ and $G_2$;

during step a), heat energy is supplied to $R'_3$ and $R'_2$ to raise them to a temperature higher than the ambient temperature, the gas exchange means are then opened between the reactors $R_3,R'_3$, the reactors $R_2,R'_2$ and the reactors $R_1,R'_1$, thereby causing the spontaneous liberation of $G_3$ in $R'_3$ and of $G_2$ in $R'_2$, the exothermic sorption of $G_3$ with the sorbent $B3$ in $R_3$ and the exothermic sorption of $G_2$ with the sorbent $B2$ in $R_2$, the endothermic desorption of the sorbent rich in gas $(B1,G_1)$ in $R_1$, the exothermic consumption of $G_1$ in $R'_1$ with the liberation of heat;

during step b), heat energy is supplied to $R'_1$ to raise it to a temperature higher than the normal temperature, the gas transfer means are then opened between the reactors $R_3,R'_3$, the reactors $R_2,R'_2$ and the reactors $R_1,R'_1$, thereby causing the liberation of gas $G_1$ in $R'_1$, the exothermic sorption of $G_1$ with the sorbent $B1$ in $R_1$, the endothermic desorption of the sorbent rich in gas $(B3, G_3)$ in $R_3$ and the sorbent rich in gas $(B2,G_2)$ in $R_2$, and the exothermic consumption of the gas $G_3$ in $R'_3$ and of the gas $G_2$ in $R'_2$.

In this embodiment, the heat introduced into the reactors $R'_2$ and $R'_3$ at an intermediate temperature is recovered in $R'_1$ at a higher temperature during the production step, and the heat introduced into $R'_1$ at an intermediate temperature is restored at a lower temperature during the regeneration step.

The method of the invention can furthermore produce heat in a phase during the production step, and regenerate the installation in two successive phases. The method is then put into practice in an installation which comprises three HP, LP and IP assemblies respectively comprising the reactors $R_1,R'_1$, $R_3,R'_3$ and $R_2,R'_2$, in the following conditions:

during a preliminary step
- the gas transfer means are closed between the different reactors,
- the respective sorbents and gases are introduced into the reactors, at normal temperature, so that $R_1$ and $R_2$ contain their respective sorbent in the state rich in gas $(S1,G_1)$ and $(S2,G_2)$, $R_3$ contains the sorbent in the state poor in gas, $R'_1$ and $R'_2$ are in a state to consume the gas $G_1$ and the gas $G_2$ respectively, and $R'_3$ is in a state to liberate the gas $G_3$;

during step a), heat energy is introduced into $R'_3$, the gas transfer means are then opened between the reactors $R_3,R'_3$ on the one hand and the reactors $R_1,R'_1$ on the other, thereby causing the spontaneous liberation of $G_3$ in $R_3$, the exothermic sorption of $G_3$ with the sorbent $B3$ in $R_3$, the endothermic desorption of the sorbent rich in gas $(B1,G_1)$ in $R_1$, the exothermic consumption of the gas $G_1$ in $R'_1$ with the production of heat at a higher temperature than that of the source supplying $R'_3$;

during step b), in a first phase, heat energy is introduced into $R'_1$, the gas transfer means are then opened between the reactors $R_1,R'_1$ on the one hand and the reactors $R_2,R'_2$ on the other, thereby causing the spontaneous liberation of $G_1$, the exothermic sorption of $G_1$ with the sorbent $B1$ in $R_1$, the endothermic desorption of the sorbent rich in gas $(B2,G_2)$ in $R_2$, and the exothermic consumption of the gas $G_2$ in $R'_2$; in a second phase, heat energy is supplied to $R'_2$, the gas transfer means are then opened between the reactors $R_2,R'_2$ on the one hand and the reactors $R_3,R'_3$ on the other, thereby causing the liberation of gas $G_2$, the exothermic sorption of $G_2$ with the sorbent $B2$ in $R_2$, the endothermic desorption of the sorbent rich in gas $(B3,G_3)$ in $R_3$, and the exothermic consumption of the gas $G_3$ in $R'_3$.

The method of the invention furthermore serves to produce heat in two successive phases during the production step, and to regenerate the installation in one phase. The method is then put into practice in an installation that comprises three HP, LP and IP assemblies respectively comprising the reactors $R_1,R'_1$, $R_3,R'_3$ and $R_2,R'_2$, in the following conditions:

during a preliminary step:
- the gas transfer means are closed between the different reactors, the respective sorbents and gases are introduced into the reactors, at normal temperature, so that $R_2$ contains the sorbent in the state rich in gas ($S2,G_2$), $R_3$ and $R_1$ contain their sorbent in the state poor in gas with B3 and B1 respectively, $R'_2$ is in a state to consume the gas $G_2$, and $R'_3$ and $R'_1$ are in a state to liberate the gas $G_3$ and $G_2$ respectively;

during step a) in a first phase, heat energy is introduced into $R'_3$, the reactors $R_3, R'_3$ on the one hand and the reactors $R_2, R'_2$ on the other are connected, thereby causing the spontaneous liberation of $G_3$, the exothermic sorption of $G_3$ with the sorbent B3 in $R_3$, the endothermic desorption of the sorbent rich in gas ($B2,G_2$) in $R_2$, the exothermic consumption of $G_2$ in $R'_2$ with the production of heat at a temperature higher than that of the source supplying $R'_3$; in a second phase, heat energy is introduced into $R'_2$, the reactors $R_1, R'_1$ on the one hand and the reactors $R_2, R'_2$ on the other are connected, thereby causing the spontaneous liberation of $G_2$, the exothermic sorption of $G_2$ with the sorbent B2 in R2, the endothermic desorption of the sorbent rich in gas ($B1,G_1$) in $R_1$, the exothermic consumption of the gas $G_1$ in $R'_1$ with the production of heat at a temperature higher than that of the source supplying $R'_2$;

during step b), heat energy is supplied to $R'_1$, the gas transfer means are then opened between the reactors $R_1, R'_1$ on the one hand and the reactors $R_3, R'_3$ on the other, thereby causing the liberation of gas $G_1$, the exothermic sorption of $G_1$ with the sorbent B1 in $R_1$, the endothermic desorption of the sorbent rich in gas ($B3,G_3$) in $R_3$, and the exothermic consumption of the gas G in $R'_3$ with the liberation of heat at a temperature lower than that of the energy source supplying $R'_1$.

In each specific case of the production of heat, during step a), a quantity of heat is brought to a higher temperature and is utilized, whereas during step b), a quantity of heat is brought to a lower temperature and consists of lost heat if the low temperature level is not useful.

The present invention is described in greater detail with the help of specific examples of operation and by reference to the corresponding Clapeyron diagrams. The description is based on reactors $R'_i$ which are the seat of a liquid/gas phase change alternately operating as evaporator and as condenser for a gas $G_i$. The transposition to installations wherein the reactors $R'_i$ are the seat of a monovariant or divariant sorption is within the scope of the person skilled in the art. In the case of a divariant sorption, the equilibrium line in the corresponding reactor $R'_i$ is a set of isosteres. In the diagrams, Ei and Ci respectively denote the evaporation and the condensation of the gas $G_i$ in the reactor $R'_i$.

DETAILED DESCRIPTION OF THE PREFERRED EMBODIMENTS

Figure 1:
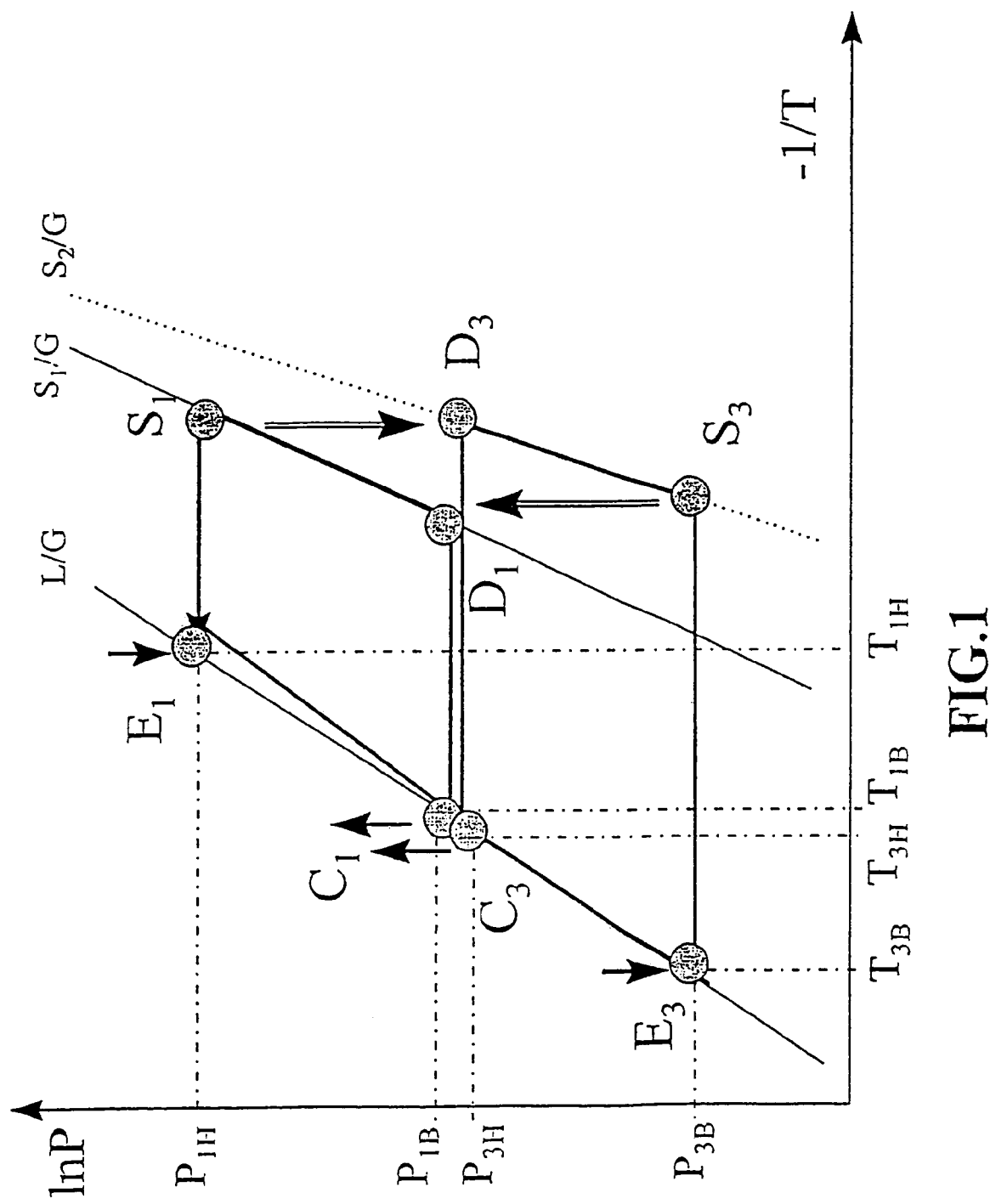
FIG. 1 shows the Clapeyron diagram of an installation according to the invention comprising two assemblies operating with two solids and one gas for the production of cold.

The production of cold in an installation comprising two HP and LP assemblies wherein the reactors $R'_1$ and $R'_3$ operate alternately as evaporator/condenser for the same gas G and the reactors $R_1$ and $R_3$ contain different sorbents B1 and B3, is shown by the Clapeyron diagram shown in FIG. 1. The sorptions in the reactors $R_1$ and $R_3$ are monovariant processes. G, B1 and B3 are selected so that, at the respective operating pressures, the sorption temperature S1 is higher than the desorption temperature D3 and the exothermic sorption temperature S3 is higher than the desorption temperature D1.

In the initial state, the reactors $R'_1$ and $R'_3$ contain the gas G in liquid form, the reactor $R_1$ contains (B1,G) and the reactor $R_3$ contains B3; $R_1$ and $R_3$ are in thermal contact; the HP and LP assemblies are isolated from the atmospheric pressure and in a thermal relation with the ambient medium;

during a first operating step, cold is produced at the temperature $T_{3B}$ in the following manner: $R_1$ is communicated with $R'_1$, and $R_3$ with $R'_3$; the HP assembly is placed at the pressure $P_{1B}$ and the LP assembly at the pressure $P_{3B}$. The pressure and temperature (P,T) conditions in which the reactors $R'_3$, $R_3$, $R_1$ and $R'_1$ are then found are materialized respectively by $E_3$, $S_3$, $D_1$ and $C_1$ in the diagram. Owing to the very great affinity between $B_3$ and C, a spontaneous evaporation of G occurs in $R'_3$. The quantity of heat $Q_3$ required to evaporate the quantity of gas G necessary for the sorption S3 is spontaneously withdrawn from the external medium, thereby producing cold at the temperature $T_{3B}$; simultaneously, the quantity of heat $Q'_3$ liberated in $R_3$ by the sorption S3 is transmitted to the content of $R_1$ and causes the desorption D1 by liberating the gas G. Said gas G is transported to the reactor $R'_1$ operating as a condenser, where the release of a quantity of heat $Q''_3$ at the temperature $T_{1B}$ is observed; during a second step, the installation is regenerated: the gas exchange means between the reactors of the same assembly being closed, a quantity of heat $Q_1$ is introduced into the reactor $R'_1$ to raise it to the temperature $T_{1H}$, the reactors $R_1, R'_1$ on the one hand and the reactors $R_3$ and $R'_3$ on the other are then placed in communication. In the HP assembly, the pressure settles at the equilibrium pressure $P_{1H}$, causing the evaporation of G in $R'_1$, the exothermic sorption S1 in $R_1$, the transfer of heat $Q'_1$ released by the sorption S1 to $R_3$ to cause the desorption $D_3$, the liberation of the gas G in $R_3$ and its condensation in $R'_3$ with the liberation of a quantity of heat $Q'''_3$ at the temperature $T_{3H}$. The conditions (P,T) in which the reactors $R'_3$, $R_3$, $R_1$ and $R'_1$ are found are materialized respectively by the points $C_3$, $D_3$, $S_1$ and $E_1$ in the diagram. The installation is then again ready to produce cold. If the reactor $R_3$ and the reactor $R'_3$ are isolated from each other at this time, the installation stores potential cold. The cold can be produced at any time by the simple communication of $R_3$ and $R'_3$ at the pressure $P_{3B}$.

It therefore appears that cold can be produced at the temperature $T_{3B}$ at the place where $R'_3$ is located by supplying heat energy to a reactor $R'_1$ which may be installed elsewhere, and particularly in a place where the heat energy is readily available. If the temperatures $T_{3H}$ and $T_{1B}$ are useful temperature levels, the installation serves simultaneously to produce cold in $R'_3$ and heat in $R'_1$ during the so-called cold production step, and degraded heat in $R'_3$ during the regeneration step from the heat supplied to $R'_1$.

Cold is transported by the simple transport of the gas G in a pipe connecting the reactor $R_1$ and the reactor $R'_1$ and in a pipe connecting the reactor $R_3$ and the reactor $R'_3$ associated with it. The gas G and the sorbents B1 and $B_3$ used are selected as a function of the temperature at which the cold is to be produced, and the temperature of the heat energy source available.

The theoretical cold production efficiency of such an installation, which can be written $\eta_P = Q_3/Q_1$, is the ratio of the quantity of useful heat $Q_3$ to the quantity of heat introduced. In practice, it is close to 1.

The transport efficiency, which is defined by the ratio of the useful production in a remote site ($Q_{P3}$) to the useful production made in situ ($Q_{P1}$), can be written $$\eta_t = Q_{P3}/Q_{P1} + W = 1 - (\text{loss}/Q_{P1} + W)$$

where W is the gas pumping work. The transport of thermal energy with an installation according to the invention is not accompanied by heat losses, because the energy is transported in chemical form, by a simple gas circulation.

Figure 2:
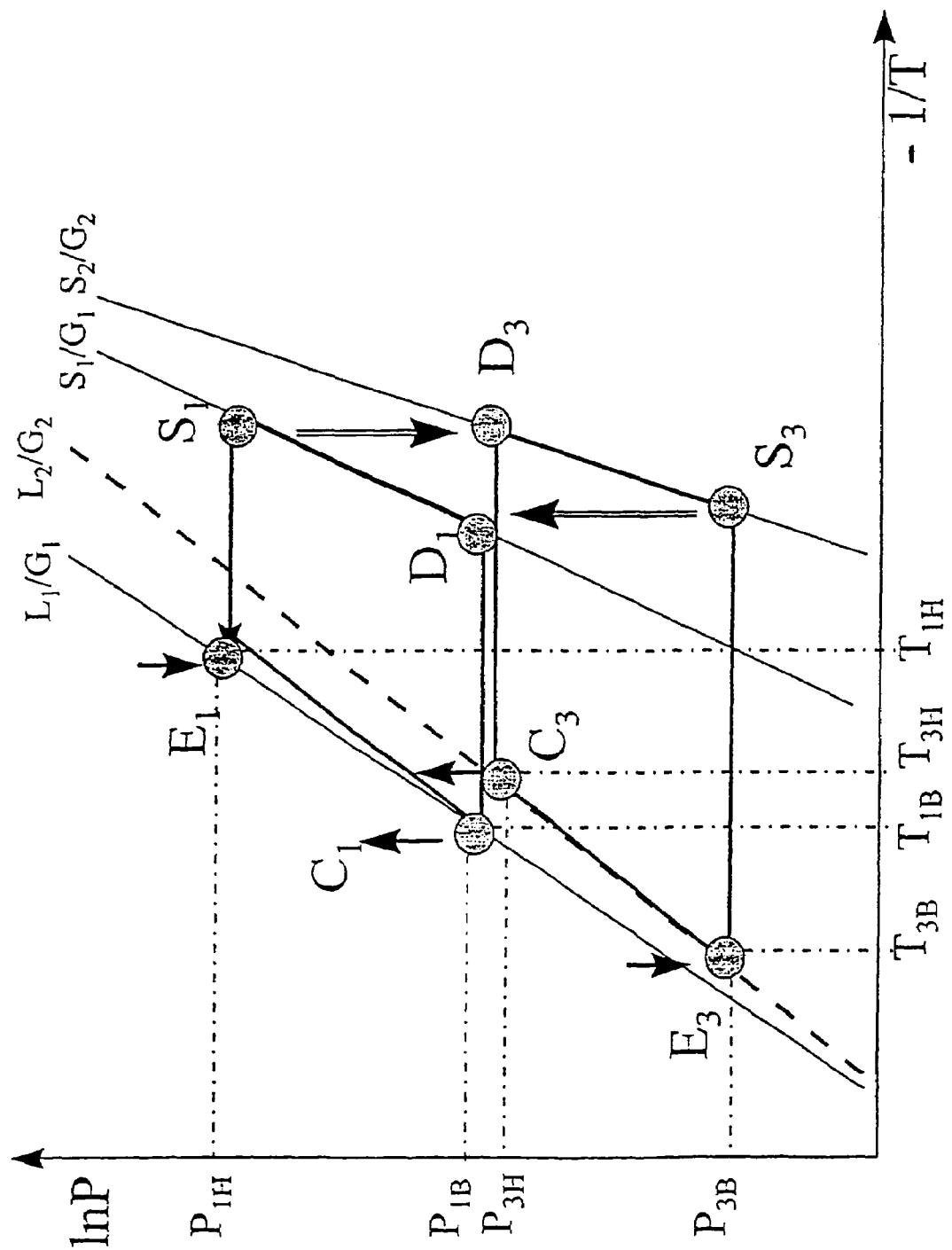
FIG. 2 shows the Clapeyron diagram of an installation according to the invention comprising two assemblies operating with two solids and two gases for the production of cold.

Another embodiment of the invention for the production of cold, and possibly of useful heat, is illustrated by FIG. 2. The installation is similar to the one employed for the case shown in FIG. 1, as well as the sequence of successive steps. The difference resides in the fact that the HP assembly operates with a working gas $G_1$ and the LP assembly operates with a working gas $G_3$ different from $G_1$. In the initial state, the reactors $R'_1$ and $R'_3$ contain the respective gases $G_1$ and $G_3$ in liquid form, the reactor $R_1$ contains (B1,$G_1$) and the reactor $R_3$ contains $B_3$. As in the previous example, the pressure and temperature (P,T) conditions in which the reactors $R'_3$, $R_3$, $R_1$ and $R'_1$ are found are materialized respectively by $E_3$, $S_3$, $D_1$ and $C_1$ in the diagram. This means that, during the first operating step, the quantity $Q_3$ of cold produced in $R'_3$ is at the temperature $T_{3B}$ which is that of the evaporation of $G_3$ and the quantity of heat $Q''_3$ produced in the reactor $R'_1$ is at the temperature $T_{1B}$ which is that of the condensation of $G_1$. At the beginning of the second step, the conditions (P,T) in which the reactors $R'_3$, $R_3$, $R_1$ and $R'_1$ are found are materialized respectively by the points $C_3$, $D_3$, $S_1$, and $E_1$ in the diagram. During this second step, the quantity of heat $Q_1$ required to evaporate the quantity of gas $G_1$ necessary for the sorption S1 is introduced at the temperature $T_{1H}$ which is that of evaporation of $G_1$ and the quantity of heat $Q'''_1$ liberated in $R'_3$ is at the temperature $T_{3H}$ which is that of the condensation of $G_3$.

Figure 3:
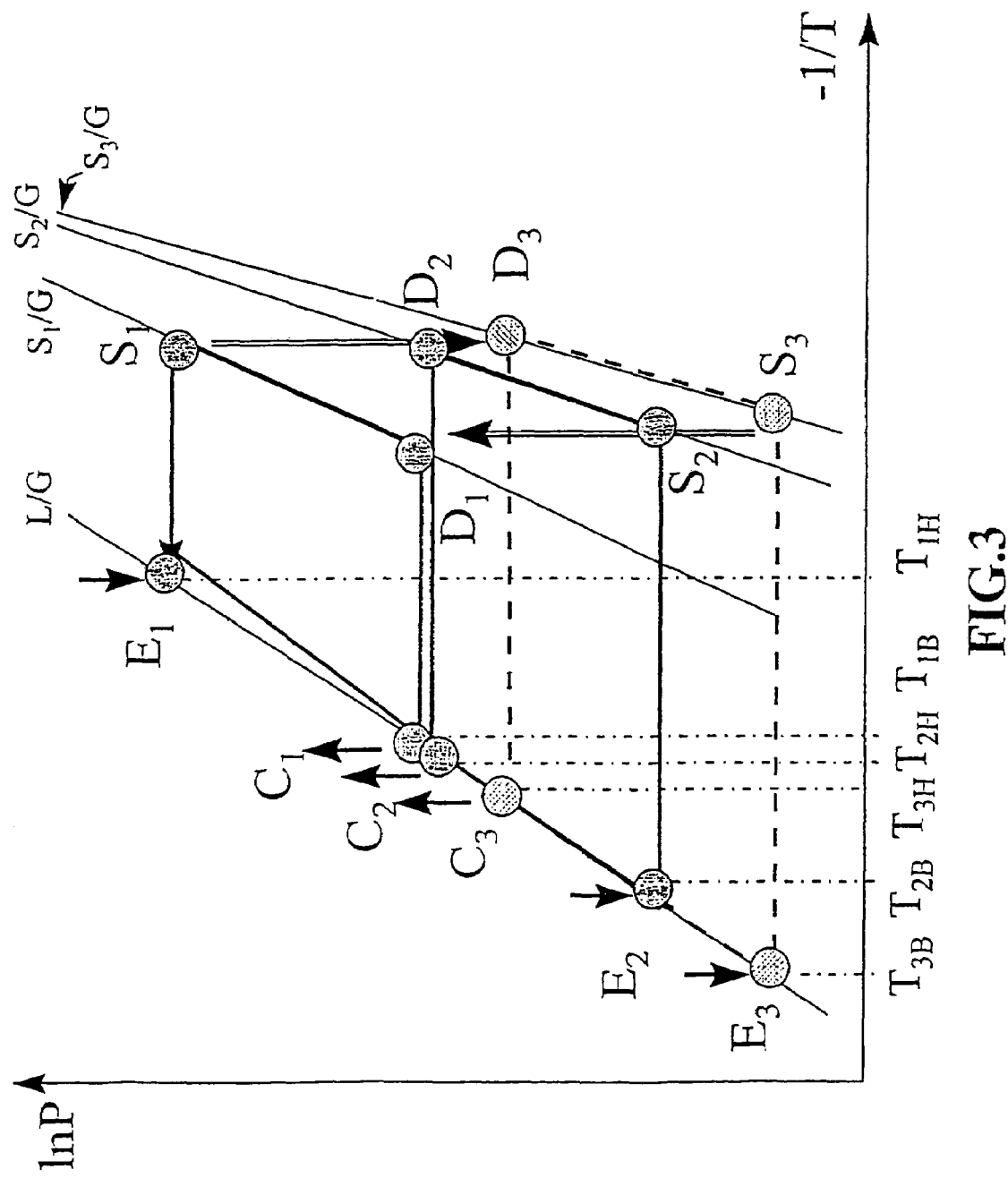
FIG. 3 shows the Clapeyron diagram of an installation according to the invention comprising three assemblies operating with three solids and one gas for the production of cold.

FIG. 3 shows the Clapeyron diagram corresponding to an installation according to the invention which comprises three HP, LP and IP assemblies. In this specific case, the gas G is identical in the three reactors $R_i$, and the sorbents Bi are all different. Such an installation allows many variants in the production of cold. In particular it allows the production of cold at two different temperatures, successively or simultaneously in the reactors $R'_2$ and $R'_3$, by the input of heat energy in $R'_1$ during the regeneration of the installation. The gas G and the sorbents Bi are selected so that, at the respective operating pressures, the temperatures of the sorptions S2 and S3 are substantially identical to each other and slightly higher than the temperature of the desorption D1, and so that the temperature of the sorption S1 is slightly higher than the temperatures of the desorptions D2 and D3, said desorption temperatures being substantially identical. In the initial state, the three reactors $R'_i$ contain the gas G in liquid form, the reactor $R_1$ contains the sorbent in a form rich in gas (B1,G) and the reactors $R_2$ and $R_3$ contain the sorbent in a form poor in gas, respectively B2 and B3; the reactors $R_i$ and $R'_i$ of an assembly are not in communication with each other; the reactors $R_i$ are in thermal communication; the assemblies are isolated from the atmospheric pressure and are in thermal relation with the ambient medium.

During a first operating step, cold is produced at the temperatures $T_{2B}$ and $T_{3B}$ in the following manner: $R_1$ is communicated with $R'_1$, $R_2$ with $R'_2$ and $R_3$ with $R'_3$; in view of the very great affinity between B2 and G on the one hand, and B3 and G on the other, a spontaneous evaporation of G occurs in $R'_2$ and in $R'_3$ (materialized respectively by $E_2$ and $E_3$ in the figure). The quantity of heat required to evaporate the quantity of gas G necessary for the sorption S2 and the quantity of heat required to evaporate the quantity of gas G necessary for the sorption S3 are withdrawn spontaneously from the external medium, thereby producing cold at the temperatures $T_{2B}$ and $T_{3B}$; simultaneously, the quantities of heat liberated respectively in $R_2$ and in $R_3$ by the sorption are transmitted to the content (B1,G) of $R_1$ and cause the desorption D2 by liberating the gas G. Said gas G is transported to the reactor $R'_1$ operating as a condenser (denoted C1 in the figure), where a release of heat at the temperature $T_{iB}$ is observed;

during a second step, the installation is regenerated, each of the assemblies of reactors in the installation is at its high pressure level $P_{iH}$: a quantity of heat is introduced into $R'_1$ which operates as an evaporator (denoted $E_1$ in the figure), said quantity required to raise it to the temperature $T_{1H}$, the two reactors of each assembly are then communicated, thereby causing the evaporation of gas G in $R'_1$, and the sorption S1 in $R_1$; the quantity of heat released by the sorption is transmitted to the content of the reactors $R_2$ and $R_3$ and causes the desorptions D2 and D3; the gas liberated is transmitted to the reactors $R'_2$ and $R'_3$ in which it is condensed by liberating heat (denoted respectively $C_2$ and $C_3$ in the figure) respectively at the temperatures $T_{3H}$ and $T_{2H}$; at the end of this step, the installation is again ready to supply cold. If each of the reactors $R_2$ and $R_3$ is isolated from the respective reactor $R'_2$ and $R'_3$ at this time, the installation stores potential cold, which can be liberated at any time by the simple communication of $R_2$ and $R'_2$ on the one hand and of $R_3$ and $R'_3$ on the other.

To produce cold selectively at the temperature $T_{2B}$ or at the temperature $T_{3B}$, the first step is carried out by connecting the reactors $R_1$ and $R'_1$ on the one hand and, on the other, either the reactors $R_3$ and $R'_3$ in order to produce cold at $T_{3B}$, or the reactors $R_2$ and $R'_2$.

Figure 4:
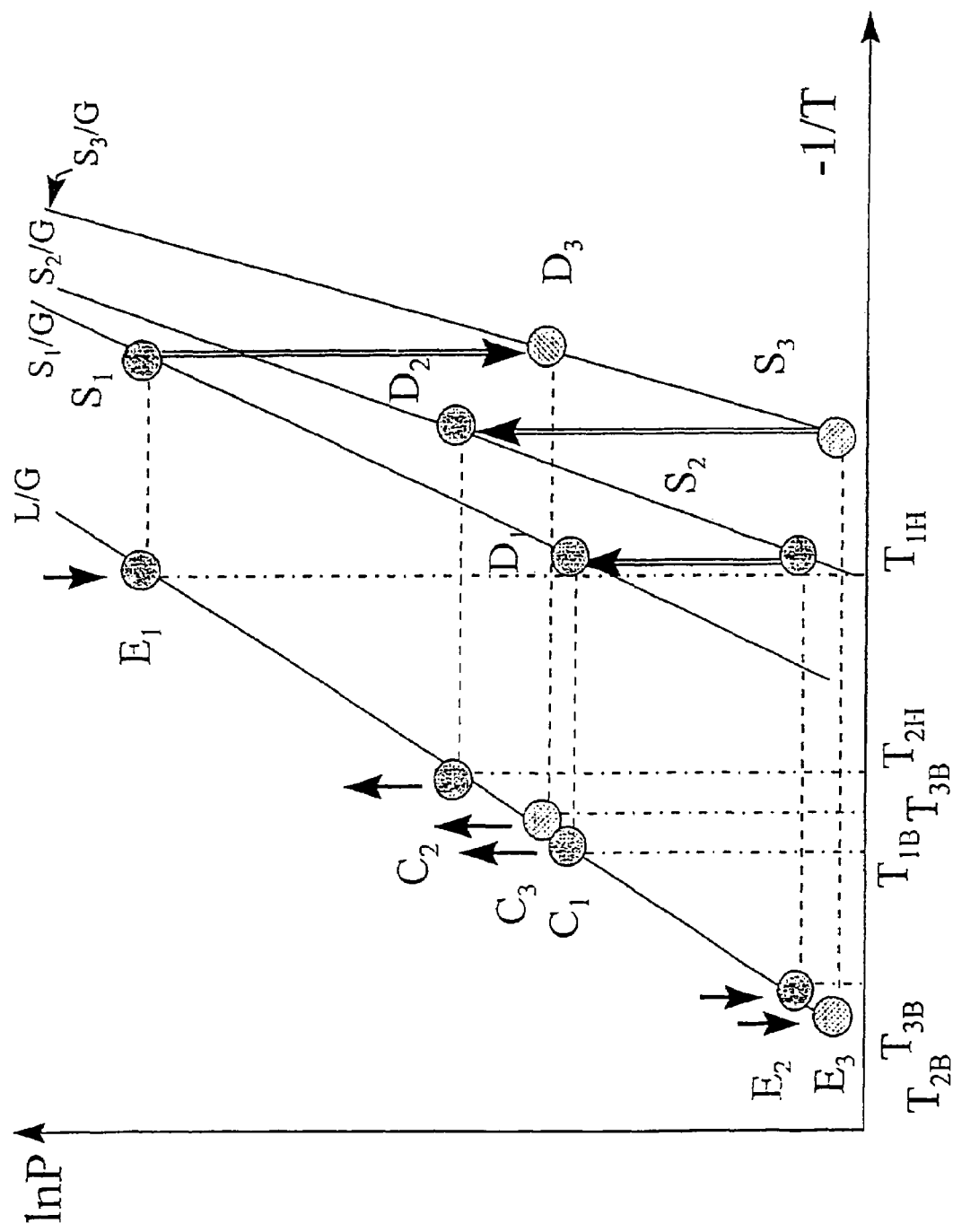
FIG. 4 shows another Clapeyron diagram of an installation according to the invention comprising three assemblies operating with three solids and one gas for the production of cold.

FIG. 4 shows the Clapeyron diagram corresponding to an installation according to the invention which comprises three assemblies of two reactors. As in the previous case, the working gas G is identical in the three reactors $R_i$, and the sorbents Bi are all different. At the start of the process, the reactor $R_3$ contains B3 and the other two reactors respectively contain (B1,G) and (B2,G), and the whole system is at ambient temperature.

During a first step, $R_3$ is connected with $R'_3$ and $R_2$ is connected with $R'_2$, thereby initiating the evaporation of G with the production of cold at the temperature $T_{3B}$, the sorption S3 in $R_3$ with the production of heat transmitted to (B2,G) contained in $R_2$, which causes the desorption D2 and the liberation of gas G which condenses in $R'_2$ with the liberation of heat at the temperature $T_{2H}$. The conditions (P,T) in which the reactors $R'_3$, $R_3$, $R_2$ and $R'_2$ are found during this step are materialized respectively by the points $E_3$, $S_3$, $D_2$ and $C_2$ in the diagram;

during a second step, the production of cold is caused similarly at $R'_2$ by the contacting of $R_2$ and $R'_2$ on the one hand and of $R_1$ and $R'_1$ on the other, thereby causing the sorption S2 which supplies to $R_1$ the heat necessary for the desorption D1 followed by the production of heat at the temperature $T_{1B}$ due to the condensation in $R'_1$ of the liberated gas. The conditions (P,T) in which the reactors $R'_2$, $R_2$, $R_1$ and $R'_1$ are found in this step are materialized respectively by the points $E_2$, $S_2$, $D_1$ and $C_1$ in the diagram;

during a third step, the system is regenerated by supplying heat to $R'_1$ to raise it to the temperature $T_{1H}$, and $R_3$ and $R'_3$ on the one hand and $R_1$ and $R'_1$ on the other are then contacted, to liberate the gas G in the direction of $R_1$ for the sorption S1. The heat liberated is transferred in $R_3$ for the desorption D3 and the production of heat in $R'_3$ by condensation of the liberated gas. The conditions (P,T) in which the reactors $R'_3$, $R_3$, $R_1$ and $R'_1$ are found during this step are materialized respectively by the points $C_3$, $D_3$, $S_1$ and $E_1$ in the diagram. The installation is then ready for a new cold production sequence.

The respective cold production temperatures $T_{2B}$ and $T_{3B}$ are substantially the same. It is therefore possible to produce a large quantity of cold, since it corresponds to two evaporation processes.

Figure 5:
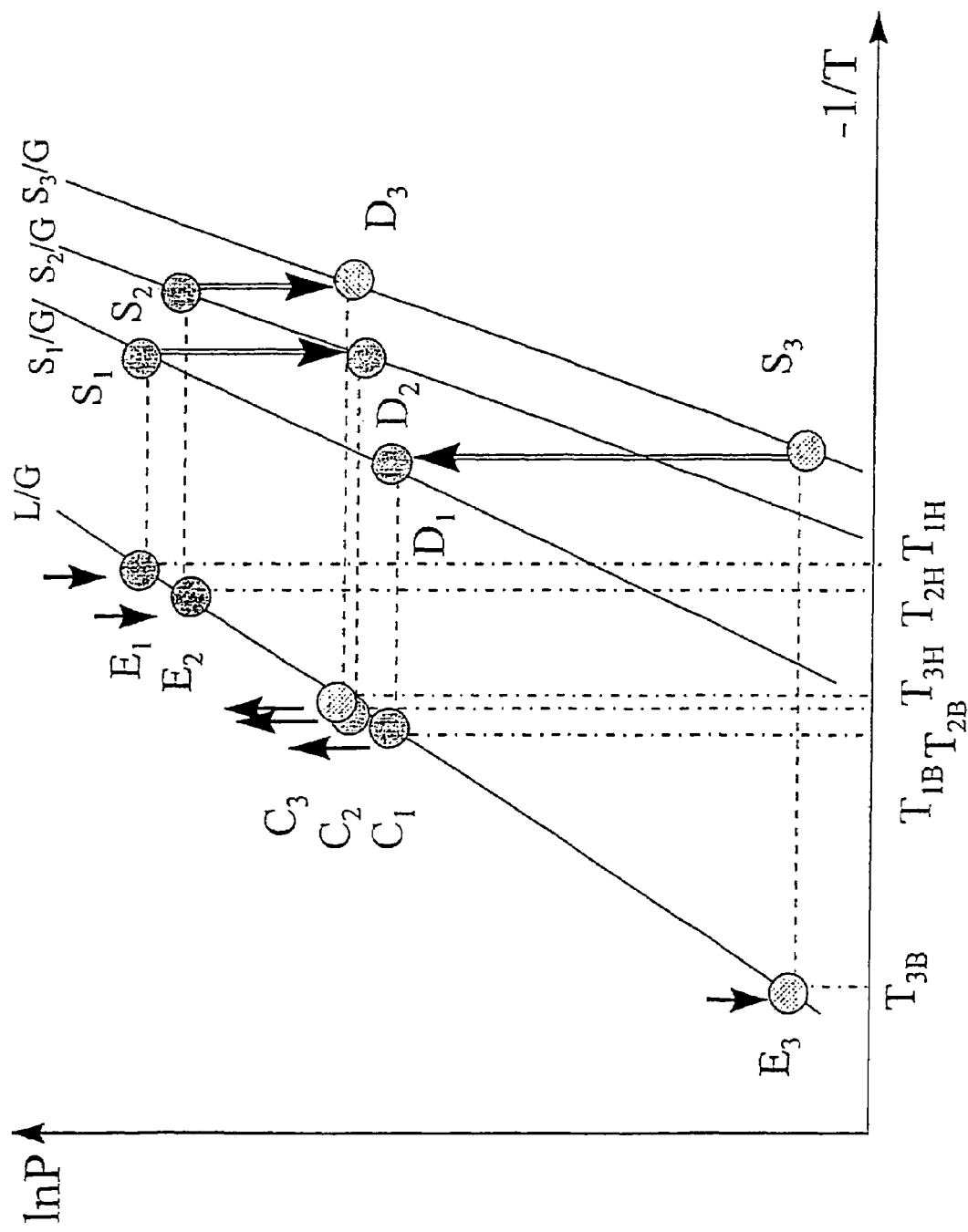
FIG. 5 shows another Clapeyron diagram of an installation according to the invention comprising three assemblies operating with three solids and one gas for the production of cold.

FIG. 5 shows the Clapeyron diagram corresponding to an installation according to the invention which comprises three assemblies of two reactors. As in the previous case, the working gas G is identical in the three reactors $R_i$, and the sorbents Bi are all different. At the start of the process, the reactor $R_3$ contains B3 and the other two reactors contain (B1,G) and (B2,G) respectively, at ambient temperature. A difference from the previous examples resides in the fact that, during the cold production step, only the reactor $R_3$ operates in sorption mode with the production of cold in the reactor $R'_3$ at the temperature $T_{3B}$.

During a first step, the connection of $R_3$ and $R'_3$ and of $R_1$ and $R'_1$ causes the spontaneous evaporation of the gas G in $R'_3$. The liberated gas G causes the sorption S3 with release of heat which is transferred to $R_1$ to cause there the desorption D1, the condensation of the gas liberated in $R'_1$ with the production of heat at the temperature $T_{1B}$;

during a second step, heat is added to the reactor $R'_1$ to raise it to the temperature $T_{1H}$, $R_1$ and $R'_1$ are then contacted on the one hand, $R_2$ and $R'_2$ on the other, with the effect of liberating the gas G necessary for the sorption S1 in $R_1$, the heat released being transferred to $R_2$ for the desorption D2 and the liberation of G which condenses in $R'_2$ with the production of heat;

during a third step, heat is added to $R'_2$ to raise it to the temperature $T_{2H}$, $R_3$ and $R'_3$ are then contacted on the one hand, $R_2$ and $R'_2$ on the other, with the effect of liberating the gas G necessary for the sorption S2 in $R_2$, the heat released being transmitted to $R_3$ for the desorption of (B3,G) formed during the previous step, so that the installation is regenerated for a new cold production sequence at $T_{3B}$.

This embodiment serves to produce cold at a very low temperature.

Figure 6:
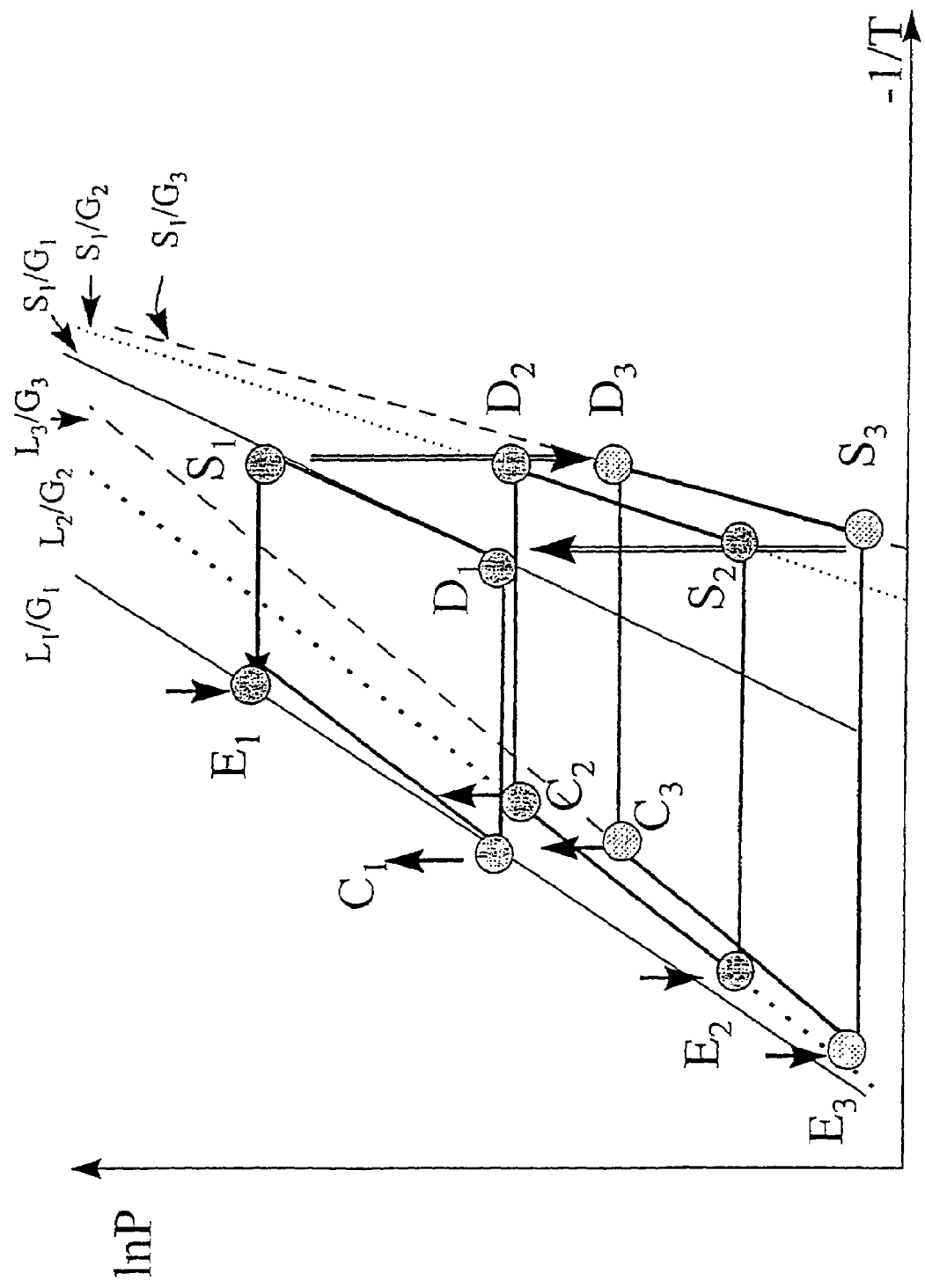
FIG. 6 shows the Clapeyron diagram of an installation according to the invention comprising three assemblies operating with one solid and three gases for the production of cold.

FIG. 6 shows the Clapeyron diagram corresponding to an installation similar to the one shown in FIG. 3 and operating in the same manner. The only difference resides in the fact that a different working gas is used in each assembly. The cold is produced during a first step in the reactors $R'_2$ and $R'_3$ at the temperatures $T_{2B}$ and $T_{3B}$ and the installation is regenerated during a second step by adding heat energy to $R'_1$ operating as an evaporator at the elevated temperature $T_{1H}$.

Figure 7:
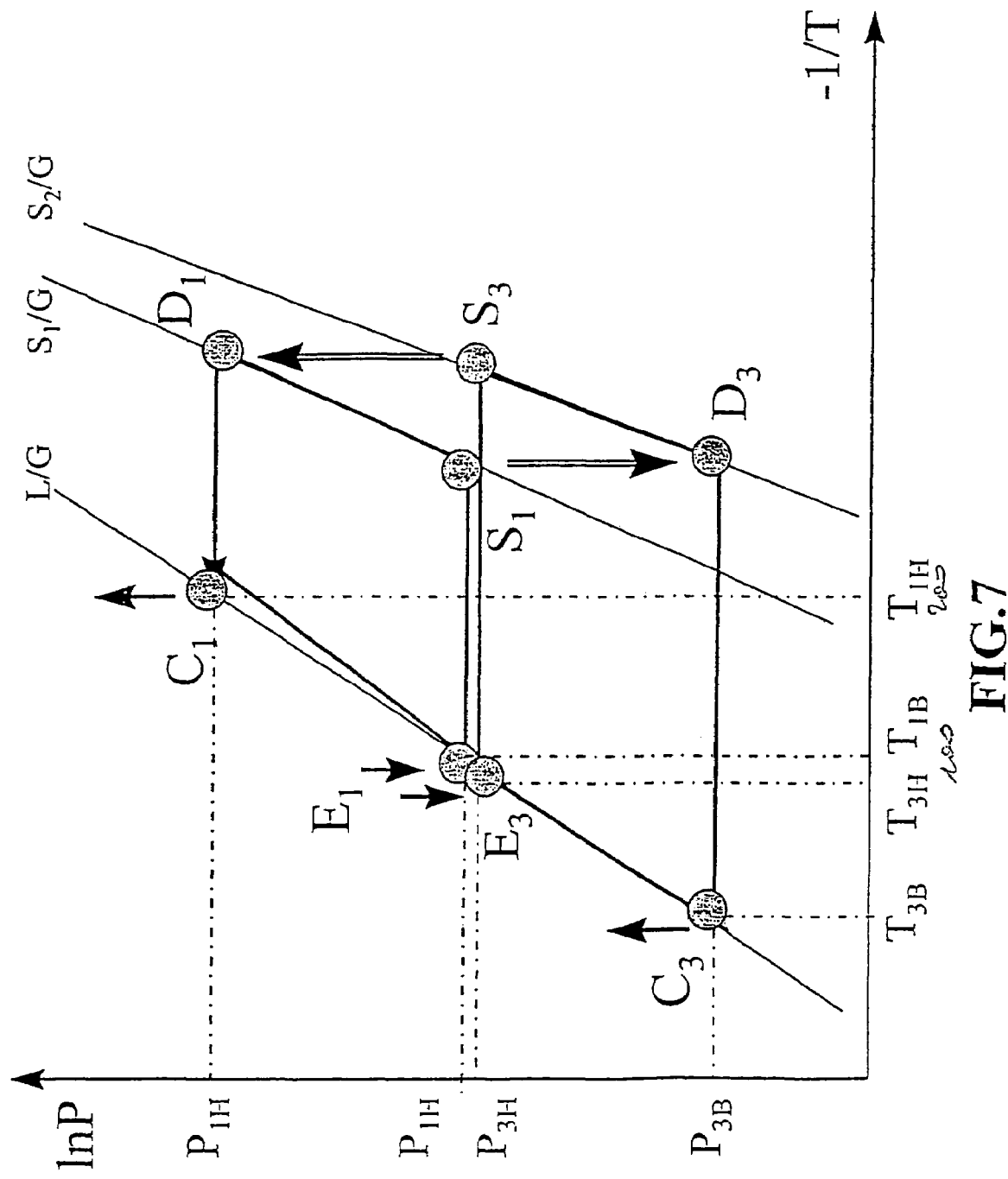
FIG. 7 shows the Clapeyron diagram of an installation according to the invention comprising two assemblies operating with two solids and one gas for the production of heat.

FIG. 7 shows the Clapeyron diagram corresponding to an installation according to the invention which is similar to the one used in the embodiment in FIG. 1 and which comprises two reactors $R_1$ and $R_3$ and two associated reactors $R'_1$ and $R'_3$, but operating to produce a quantity of heat at a temperature higher than that of the source. In the initial state, the reactors $R'_1$ and $R'_3$ contain the gas G in liquid form, the reactor $R_1$ contains (B1,G) and the reactor $R_3$ contains B3;

during a first operating step, heat is produced at the temperature $T_{1H}$ in the following manner: heat energy is added to $R'_3$ to raise it to the temperature $T_{3H}$, $R_1$ is then communicated with $R'_1$, and $R_3$ with $R'_3$, causing the spontaneous evaporation of G in $R'_3$ with the production of cold, the transfer of G in $R_3$ for the sorption S3, the transfer of the heat liberated by the sorption to $R_1$ and the desorption in $R_1$, the transfer of the gas liberated to $R'_1$ and condensation with the liberation of heat at the temperature $T_{1H}$;

during a second step, the installation is regenerated, by adding heat to $R'_1$ to raise it to the temperature $T_{1B}$, then by communicating the reactors of the same assembly, thereby causing the evaporation of G in $R'_1$, the transfer of G to $R_1$, the exothermic sorption in $R_1$, the transfer of the heat released to $R_3$, the desorption in $R_3$, the transfer and the condensation of the gas to $R'_3$ with the release of heat at a temperature lower than the ambient temperature; the installation is then ready for a new heat production step at a temperature level higher than that of the source.

In this embodiment, heat can be produced at a given place using a heat source located at another place, the heat being produced at a temperature level higher than that of the source, by simply transporting a gas in a pipe connecting the reactor $R_1$ and the reactor $R'_1$ (evaporator/condenser in the present case) on the one hand, and the reactor $R_3$ and the evaporator/condenser $R'_3$ associated with it on the other. The working gas G and the sorbents $B_1$ and $B_3$ used are selected as a function of the temperature at which the heat is to be produced, and of the temperature of the heat energy source available.

Figure 8:
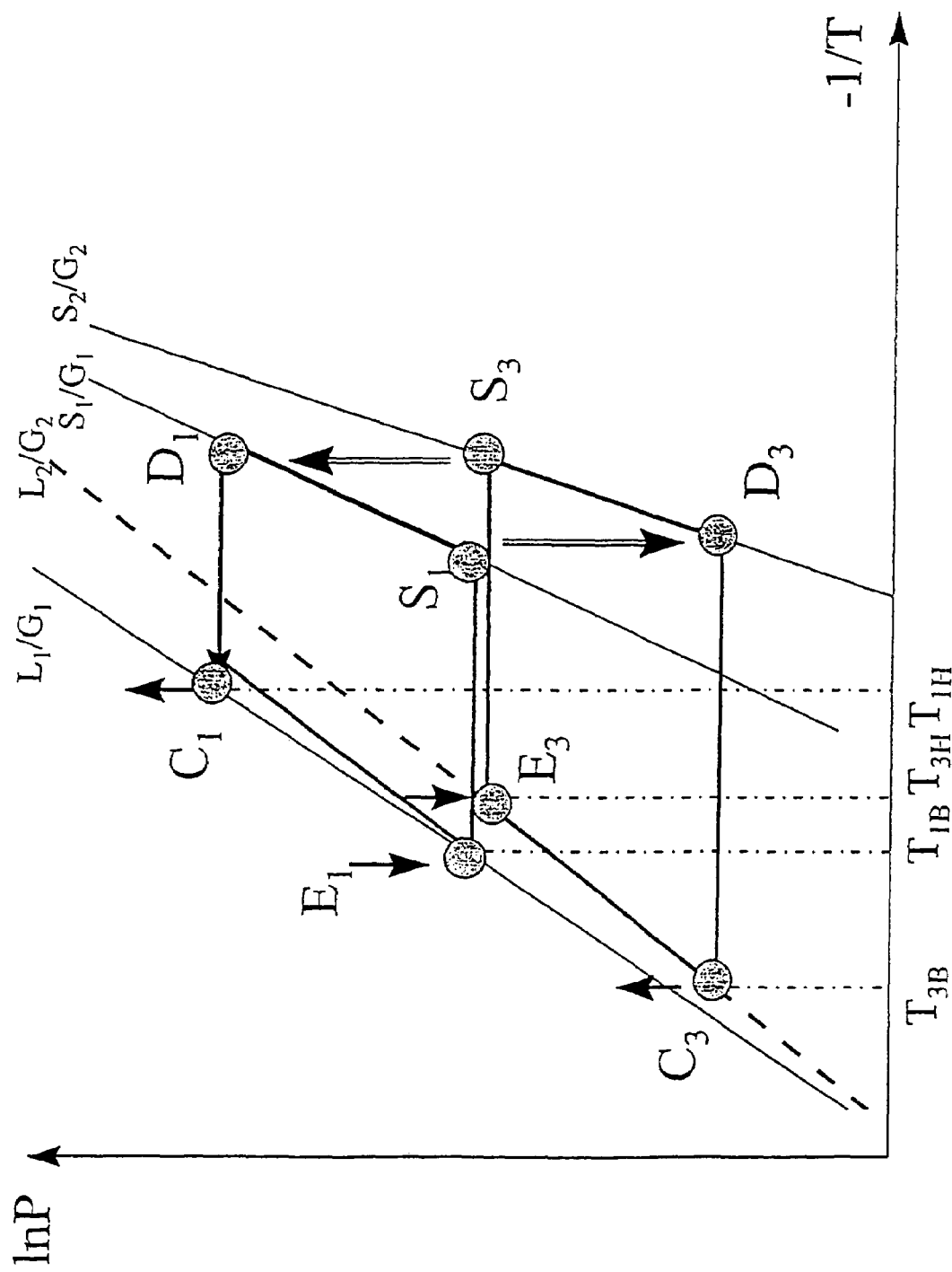
FIG. 8 shows the Clapeyron diagram of an installation according to the invention comprising two assemblies operating with two solids and two gases for the production of heat.

Another embodiment of the invention for the production of heat is shown in FIG. 8. The installation is similar to the one employed for the case shown in FIG. 7, as well as the sequence of successive steps. The difference resides in the fact that the gases $G_1$ and $G_3$ are different. In the initial state, the reactors $R'_1$ and $R'_3$ contain the respective gases $G_1$ and $G_3$ in liquid form, the reactor $R_1$ contains ($B1,G_1$) and the reactor $R_3$ contains $B_3$. This means that, during the first operating step, the quantity of useful heat is produced in $R'_1$ at the temperature $T_{1H}$ which is that of the condensation of $G_1$ and during the second regeneration step, the quantity of degraded heat recovered in $R'_3$ is at the temperature $T_{3B}$ which is that of the condensation of $G_3$.

Figure 9:
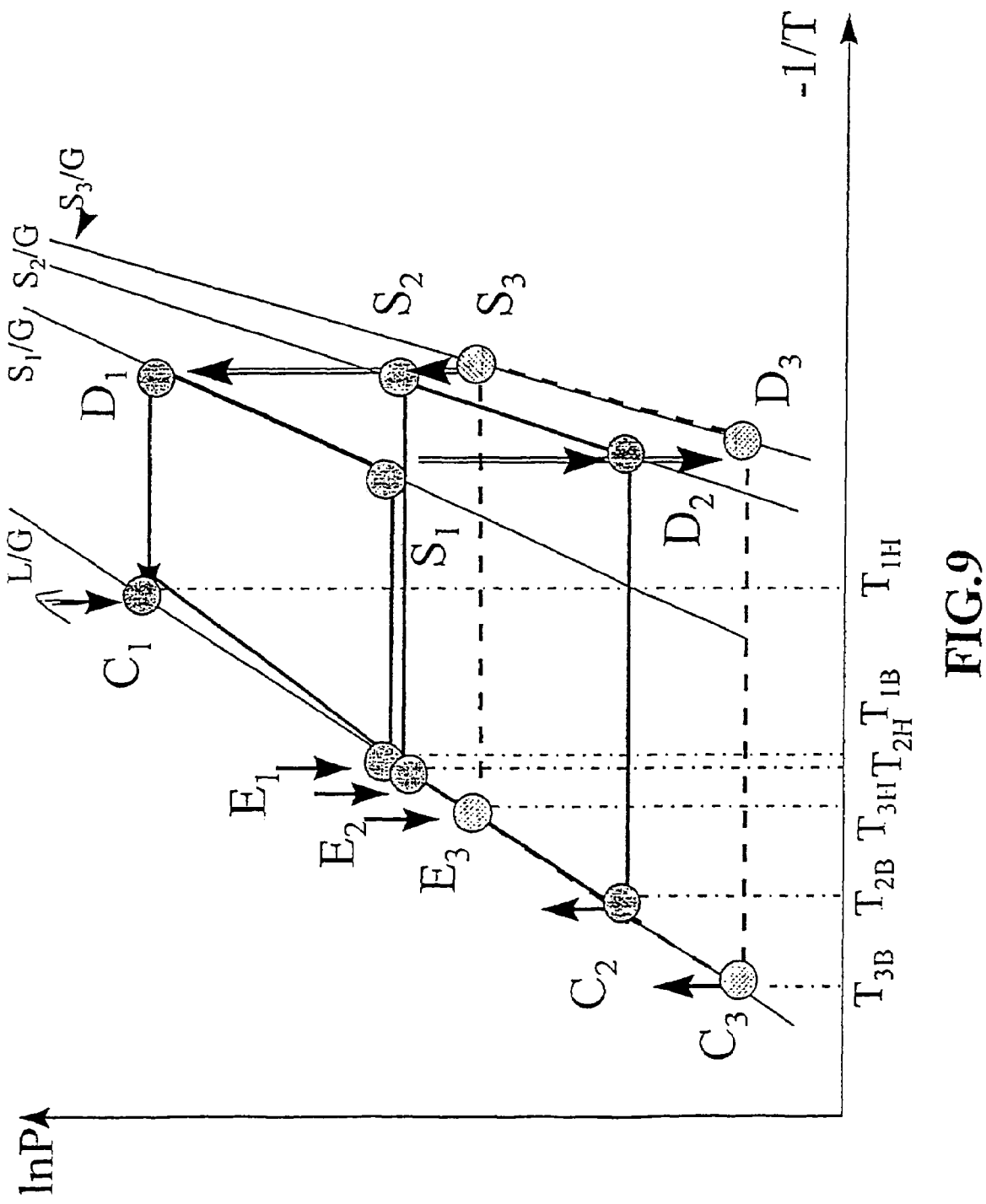
FIG. 9 shows the Clapeyron diagram of an installation according to the invention comprising three assemblies operating with three solids and one gas for the production of heat.

FIG. 9 shows the Clapeyron diagram corresponding to the production of heat in an installation similar to the one used for the production of cold in the example shown in FIG. 3.

At the beginning of the process, the reactors $R_2$ and $R_3$ contain B2 and B3 respectively, the reactor $R_1$ contains (B1,G), and the corresponding reactors $R'_i$ contain the gas G in its liquid form.

In a first step, sufficient quantities of heat are introduced respectively in $R'_2$ and $R'_3$, said quantities being necessary to raise them to the respective temperatures $T_{2H}$ and $T_{3H}$ which are higher than the ambient temperature, and the reactors of each assembly are then communicated. The gas G evaporates spontaneously in $R'_2$ and $R'_3$, causing the sorptions S2 and S3. The heat released during each sorption is transmitted to the reactor $R_1$ for the desorption D1 which liberates gas G which condenses in $R'_1$, producing useful heat at the temperature $T_{1H}$;

in a second step, heat is introduced into $R'_1$ to raise it to the temperature $T_{1B}$, and the reactors of each assembly are then communicated. The gas G evaporates spontaneously in $R'_1$ causing the sorption S1; the heat released by S1 is transmitted to $R_2$ and $R_3$, causing the desorptions D2 and D3, so that the installation is again in a state to produce heat. If the reactors $R'_2$ and $R_2$ on the one hand, and $R'_3$ and $R_3$ on the other, are not connected, the heat is stored. Since storage takes place in chemical form, there are no heat losses.

Figure 10:
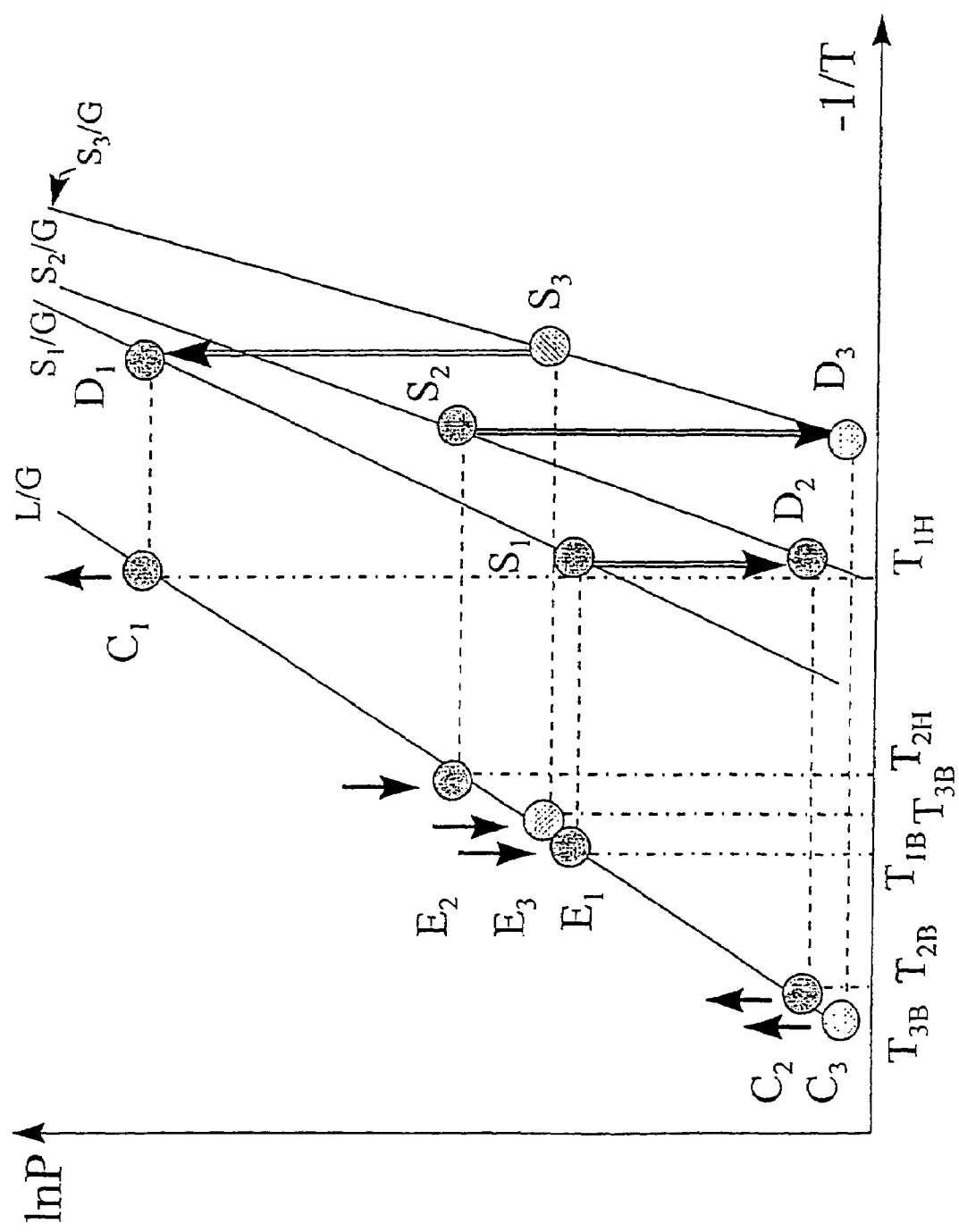
FIG. 10 shows another Clapeyron diagram of an installation according to the invention comprising three assemblies operating with three solids and one gas for the production of heat.

FIG. 10 shows the Clapeyron diagram corresponding to an installation according to the invention which comprises three HP, LP and IP assemblies. The working gas G is identical in the three reactors $R_i$, and the sorbents Bi are all different. The production of useful heat takes place in $R'_1$ operating as a condenser at its highest pressure level, thereby corresponding to the highest temperature of the installation. The installation is regenerated in two steps by the introduction of heat at an intermediate temperature level.

At the start of the process, the reactor $R_3$ contains B3 and the other two reactors contain (B1,G) and (B2,G) respectively, at ambient temperature.

During a first step, heat is introduced into $R'_3$ to raise it to the temperature $T_{3H}$ higher than the ambient temperature, $R_3$ and $R'_3$ are then communicated on the one hand, and $R_1$ and $R'_1$ on the other; the spontaneous evaporation of G in $R'_3$ causes the sorption S3 in $R_3$ with the production of heat transmitted to (B1,G) contained in $R_1$, then the desorption D1 and the liberation of gas G which condenses in $R'_1$ with the liberation of heat at the temperature $T_{1H}$ higher than $T_{3H}$;

during a second step, heat is introduced into $R'_1$ to raise it to a temperature $T_{1B}$ higher than the ambient temperature, $R_2$ and $R'_2$ are then communicated on the one hand, and $R_1$ and $R'_1$ on the other; the spontaneous liberation of G in $R'_1$ causes the sorption S1 which supplies to $R_2$ the heat necessary for the desorption D2, and the condensation of G in $R'_2$;

during a third step, heat is supplied to $R'_2$, $R_2$ and $R'_2$ are then communicated on the one hand, and $R'_3$ and $R_3$ on the other, to liberate the gas G in the direction of $R_2$ for the sorption S2. The heat liberated is transferred in $R_3$ for the desorption D3. The installation is then ready for a new heat production sequence.

In this embodiment, the installation according to the invention produces heat utilized at a high level during the first step, and regeneration takes place during the $2^{nd}$ and $3^{rd}$ steps.

Figure 11:
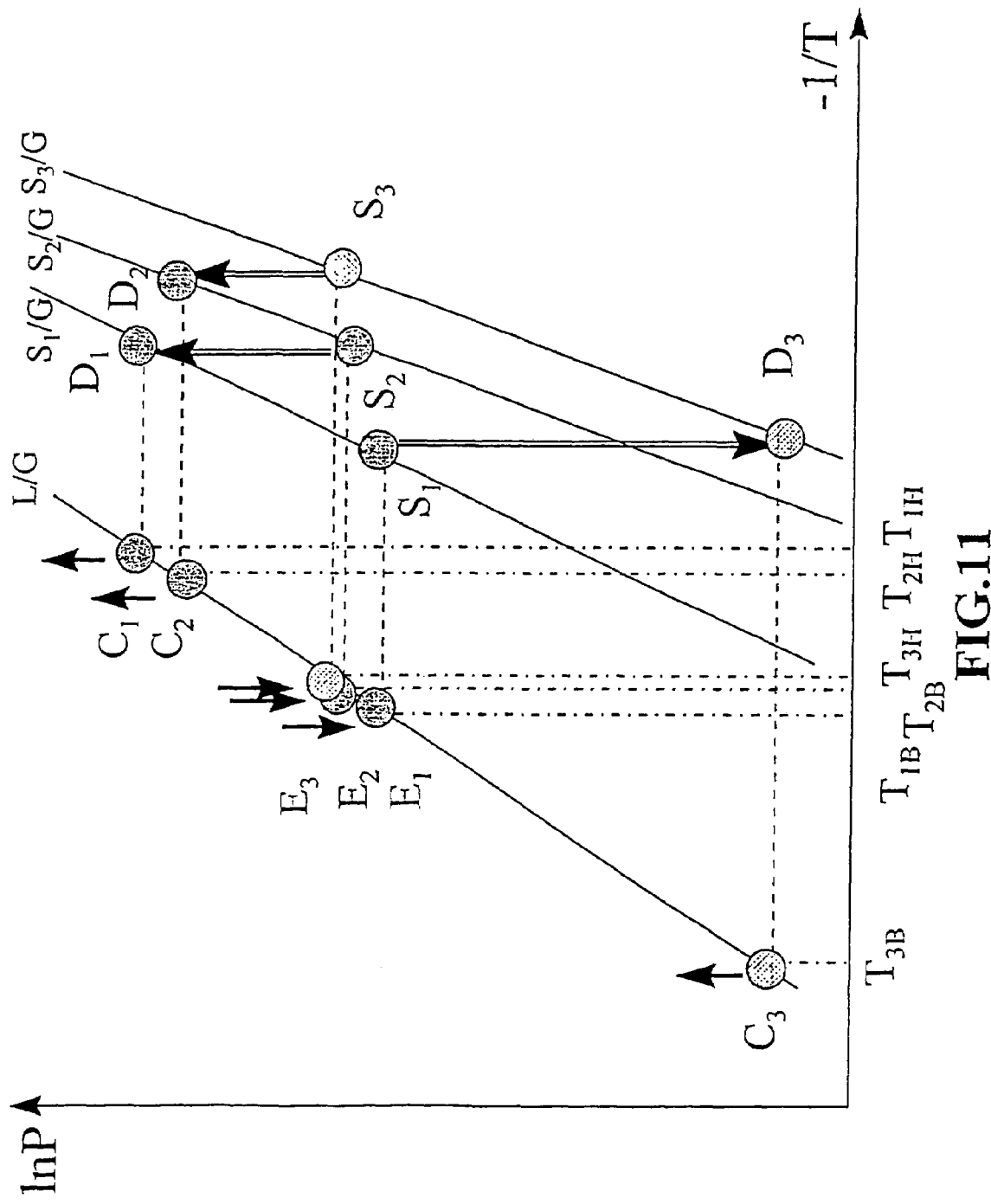
FIG. 11 shows another Clapeyron diagram of an installation according to the invention comprising three assemblies operating with three solids and one gas for the production of heat.

FIG. 11 shows the Clapeyron diagram corresponding to an installation according to the invention which comprises three HP, LP and IP assemblies. The working gas G is identical in the three reactors $R_i$, and the sorbents Bi are all different.

At the start of the process, the reactor $R_3$ contains B3 and the other two reactors contain (B1,G) and (B2,G) respectively.

During a first step, heat is introduced into $R'_3$, the heat necessary to raise it to the temperature $T_{3H}$, $R_3$ and $R'_3$ are then communicated on the one hand, and $R_2$ and $R'_2$ on the other; the evaporation of G in $R'_3$ causes the sorption S3 in $R_3$ with the production of heat transmitted to (B2,G) contained in $R_2$, then the desorption D2 and the liberation of gas G which condenses in $R'_2$ with the liberation of heat at the temperature $T_{2H}$;

during a second step, $R'_2$ is raised to the temperature $T_{2H}$, $R_2$ and $R'_2$ are then communicated on the one hand, and $R_1$ and $R'_1$ on the other, causing the sorption S2 which supplies to $R_1$ the heat necessary for the desorption D1; the liberated gas condenses in $R_1$ while liberating heat at the temperature $T_{1H}$;

during a third step, heat is supplied to $R'_1$ to raise it to the temperature $T_{1B}$, $R_1$ and $R'_1$ are then communicated on the one hand, and $R'_3$ and $R_3$ on the other to liberate the gas G in the direction of $R_1$ for the sorption S1. The heat liberated is transferred in $R_1$ for the desorption D3. The installation is then ready for a new heat production sequence.

In this embodiment of the installation with three assemblies according to the invention, the heat is produced at an elevated temperature level during the first two steps of the operating cycle, and the installation is regenerated during the third step.

Figure 12:
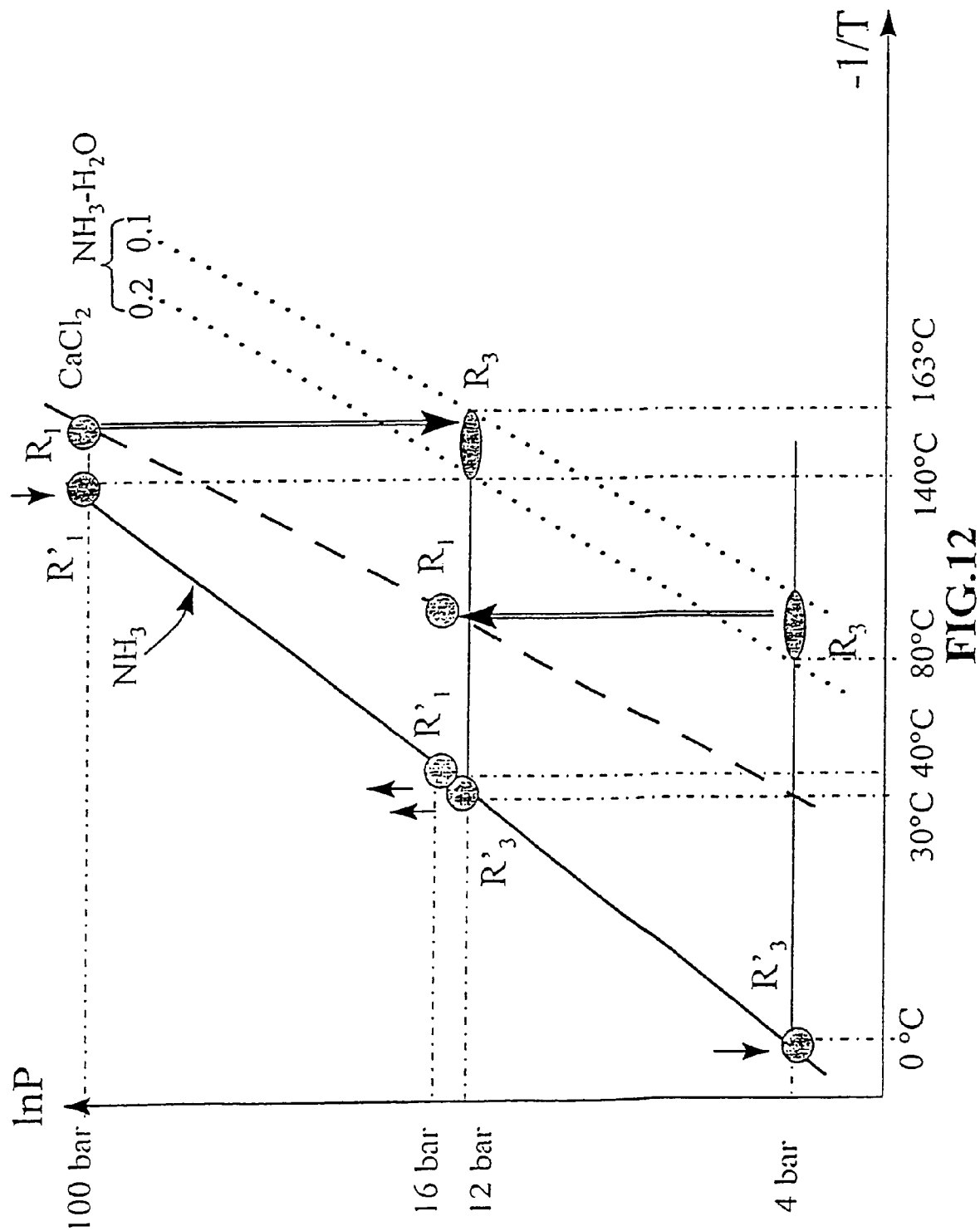
FIG. 12 shows a specific case of a Clapeyron diagram of an installation according to the invention comprising two assemblies operating with one solid, one liquid and one gas for the production of cold.

FIG. 12 shows the theoretical Clapeyron diagram of a specific installation comprising two assemblies operating for the production of cold. In the two assemblies, the working gas is ammonia and the reactors $R'_1$ and $R'_3$ consequently operate alternatively as a condenser and an evaporator of $NH_3$. In the HP assembly, the reactor $R_1$ is the seat of a reaction of $NH_3$ with $CaCl_2$. In the LP assembly, the reactor is the seat of a reversible absorption of $NH_3$ by water according to the equation

where $x_1=0.1$ and $x_2=0.2$. Since the process is bi-variant, the equilibrium line shifts as a function of the quantity of $NH_3$ absorbed. During the startup of such an installation, $CaCl_2$ is in a gas rich form and the water is poor in gas. The connecting of the reactors $R'_3$ and $R_3$ places them at a pressure of about 4 bar, causing the evaporation of $NH_3$ at 0° C. and the absorption of $NH_3$ by the water at an initial temperature of 90° C. As the water is enriched with ammonia, the temperature decreases in $R_3$ to the value of 80° C. when the ammonia content x in the water reaches 0.2. At the same time, the heat liberated by the absorption of ammonia in the water is transmitted to the reactor $R_1$ to decompose the calcium chloride rich in ammonia. The liberated ammonia condenses in $R'_1$ at 40° C. while liberating heat. To regenerate the installation, heat is introduced in $R'_1$ to evaporate the ammonia which is adsorbed on $CaCl_2$ at a temperature of 163° C. The heat liberated is transmitted to the reactor $R_3$ to liberate part of the ammonia absorbed in the water, said liberation beginning when the temperature in $R_3$ is 140° C., corresponding to the equilibrium temperature for an ammonia concentration of 0.2 in the water. If the heat produced at 40° C. is useful, the installation operates for the simultaneous production of cold and heat.

Figure 13:
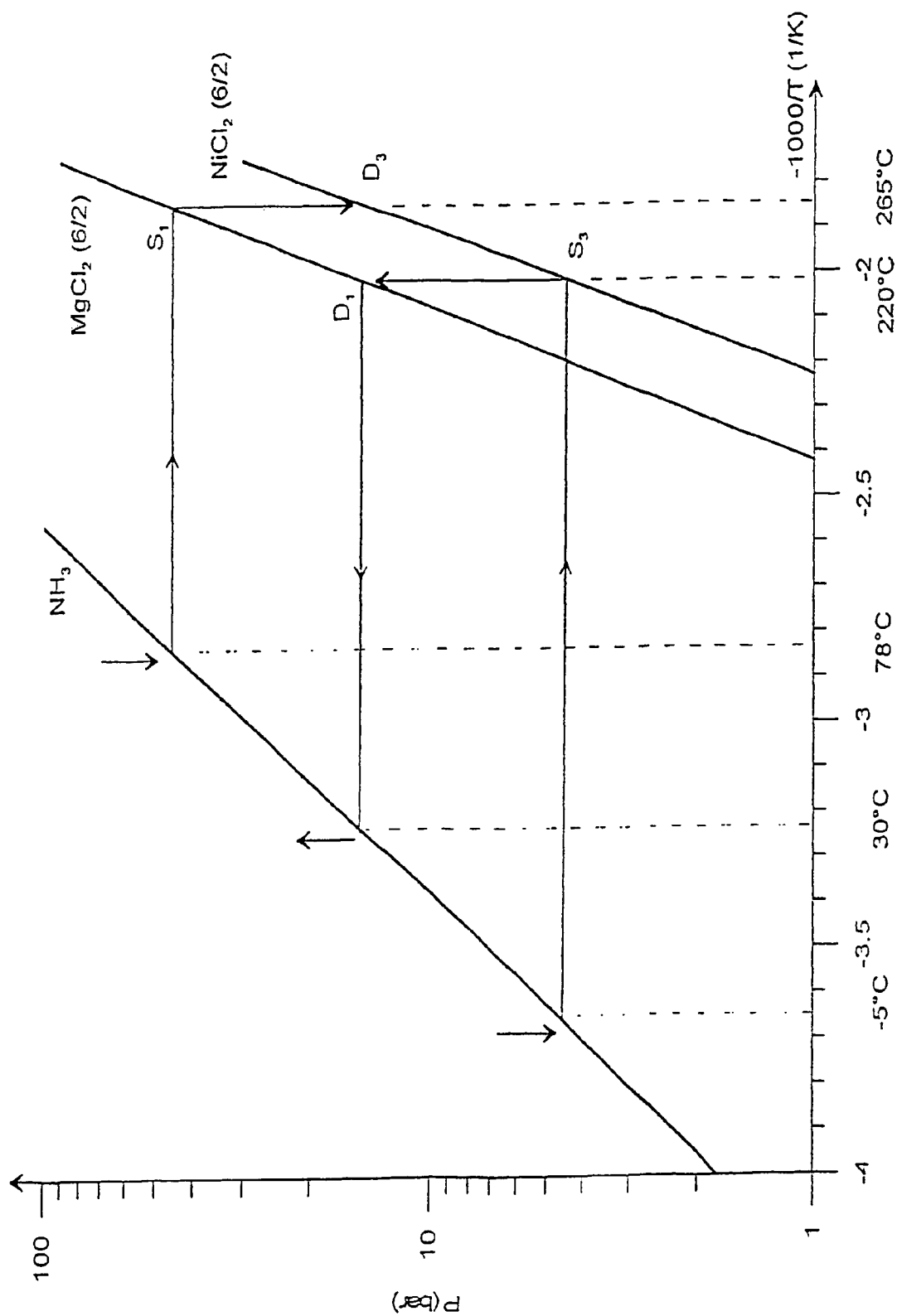
FIG. 13 shows a specific case of a Clapeyron diagram of an installation according to the invention comprising two assemblies operating with two solids and one gas for the production of cold.

FIG. 13 shows the experimental Clapeyron diagram of an installation with two assemblies operating for the production of cold. In the two assemblies, the working gas is ammonia and the reactors $R'_1$ and $R'_3$ consequently operate alternatively as condenser and evaporator of $NH_3$. In the HP assembly, the reactor $R_1$ is the seat of a reaction of $NH_3$ with $MgCl_2$ according to the equation $MgCl_2.2NH_3+NH_3 \leftrightarrows MgCl_2.6NH_3$. In the LP assembly, the reactor is the seat of a reaction of $NH_3$ with $NiCl_2$ according to the equation $NiCl_2.2NH_3+NH_3 \leftrightarrows NiCl_2.6NH_3$. During the cold production step, the ammonia is evaporated in $R'_3$ while producing cold at −5° C., the exothermic reaction in the nickel chloride occurs at 220° C. and the heat is transferred in $R_1$ for the desorption of the magnesium chloride rich in ammonia, at 220° C., the liberated ammonia condensing in $R'_1$ at 30° C. while liberating heat. During the regeneration step, heat is introduced into $R'_1$ at 78° C. to evaporate $NH_3$ which is fixed on the Mg chloride while liberating heat which is transferred in $R_3$ at 265° C. to decompose the nickel chloride rich in ammonia and the installation is again ready to produce cold. The reactor $R'_3$ is installed at the place where the cold is used, the reactor $R'_1$ is installed at the place where the heat energy is available. The cold energy is thus transported by a chemical method avoiding any heat losses.

The invention claimed is:

1. A method for producing cold and/or heat at a given place using one or a plurality of thermal energy sources comprising a succession of reversible processes between a gas and a liquid or a solid, which:

is put into practice in an installation which comprises an HP assembly comprising reactors $R_1$ and $R'_1$, an LP assembly comprising reactors $R_3$ and $R'_3$, and possibly an IP assembly comprising reactors $R_2$ and $R'_2$, in which installation:

each reactor $R_i$ is the seat of a reversible sorption alternatively producing and consuming the gas $G_i$, each reactor $R'_i$ is the seat of a reversible process alternatively producing and consuming the gas $G_i$, the respective sorbents and gases in the reactors are selected so that, at a given pressure: the sorption equilibrium temperature in the reactor $R_i$ of an assembly is higher than the equilibrium temperature of the reversible process in the reactor $R'_i$ of the same assembly, the sorption equilibrium temperature in the reactor $R_1$ is lower than that in $R_3$, and, if applicable, the sorption equilibrium temperature in $R_2$ is between the equilibrium temperatures in $R_1$ and $R_3$, the reactors $R_i$ and $R'_i$ of an assembly are equipped with means for exchanging the gas $G_i$, the reactors $R_i$ are equipped with means for exchanging heat with each other, the reactors are isolated from atmospheric pressure, and in which the thermal energy sources necessary for the operation of the installation supply the reactors $R'_i$.

2. The method as claimed in claim 1, which comprises:

a preliminary step in which the gas exchange means between two reactors of an assembly are closed and the respective sorbents and gases are placed at ambient temperature in the reactors so that the reactor $R_1$ of the HP assembly contains the sorbent in a form rich in gas $(B_1,G_1)$, the reactor $R'_1$ is in a state to consume the gas $G_1$, the reactor $R_3$ of the LP assembly contains the sorbent in a form poor in gas $B_3$ and the corresponding reactor $R'_3$ is in a state to supply gas $G_3$, a step a) of the production of cold or heat, during which the gas exchange means are opened between the reactors $R_3$ and $R'_3$ on the one hand, the reactors $R_1$ and $R'_1$, and if applicable between the reactors $R_2$ and $R'_2$, possibly after having raised the reactor $R'_3$ and if applicable $R'_2$ to a temperature higher than the normal temperature by the input of heat energy, a step b) of regeneration during which the gas exchange means are opened between the reactors $R_3$ and $R'_3$ on the one hand, the reactors $R_1$ and $R'_1$, and if applicable between the reactors $R_2$ and $R'_2$, after having raised the reactor $R'_1$ and if applicable $R'_2$ to a temperature higher than the normal temperature by the input of heat energy.

3. The method as claimed in claim 1, for producing cold at a given place using thermal energy sources located at another place, wherein:

the respective gases and sorbents in the LP assembly (or the LP and IP assemblies) are selected so that, at the respective pressure which occurs in $R'_3$ (or in $R'_3$ and $R'_2$) after opening of the gas exchange means in the reactors, the equilibrium temperature of the reversible process in $R'_3$ (or in $R'_3$ and in $R'_2$) corresponds to the temperature at which the production of cold is desired, during the step a) of production, the gas exchange means are opened between the reactors without prior input of heat energy to the reactor $R'_3$ (or to the reactors $R'_3$ and $R'_2$).

4. The method for producing cold as claimed in claim 3, which is put into practice in an installation comprising the HP and LP assemblies, under the following conditions:

during a preliminary step, the gas transfer means between $R_1$ and $R'_1$ on the one hand, between $R_3$ and $R'_3$ on the other, are closed, the respective sorbents and gases are introduced into the reactors so that the reactor $R_1$ of the HP assembly contains the sorbent in a form rich in gas $(B_1,G_1)$, the reactor $R'_1$ is in a state to consume the gas $G_1$, the reactor $R_3$ of the LP assembly contains the sorbent in a form poor in gas $B_3$ and the corresponding reactor $R'_3$ is in a state to supply gas $G_3$, the respective gases and sorbents in the LP assembly are selected so that, at the respective pressure which occurs in $R'_3$ after opening the gas exchange means, the equilibrium temperature of the reversible process in R'₃ corresponds to the temperature at which the production of cold is desired, during step a), the gas transfer means are opened between the reactors $R_3$ and $R'_3$ on the one hand, and between the reactors $R_1$ and $R'_1$ on the other, which causes the production of cold in $R'_3$, during step b), heat energy is supplied to $R'_1$ to raise it to a temperature higher than the ambient temperature, the gas transfer means are then opened between the reactors $R_3$ and $R'_3$ on the one hand and between the reactors $R_1$ and $R'_1$ on the other, thereby regenerating the installation.

5. The method for producing cold as claimed in claim 3, which is put into practice in an installation which comprises three HP, LP and IP assemblies respectively comprising the reactors $R_1,R'_1$, $R_3,R'_3$ and $R_2,R'_2$, under the following conditions:

during a preliminary step,
the gas exchange means are closed between the reactors $R_1,R'_1$, $R_3,R'_3$ and $R_2,R'_2$, the respective sorbents and gases are introduced into the reactors so that the reactor $R_1$ of the HP assembly contains the sorbent in a form rich in gas (B1,G1), the reactor $R'_1$ is in a state to consume the gas G1, the reactors $R_3$ and $R_2$ of the LP and IP assemblies contain their sorbent in a form poor in gas, respectively B3 and B2, and the reactors $R'_3$ and $R'_2$ are in a state to supply the respective gases G3 and G2, the respective gases and sorbents in the LP and IP assemblies are selected so that, at the respective pressures which occur in $R'_3$ and $R'_2$ after opening the gas exchange means, the equilibrium temperatures of the respectively reversible processes in $R'_2$ and $R'_3$ correspond to the temperatures at which the production of cold is desired, during step a), the gas exchange means are opened between the reactors $R_1,R'_1$, $R_3,R'_3$ and $R_2,R'_2$, thereby producing cold in $R'_3$ and in $R'_2$, during step b), heat energy is added to $R'_1$, the gas exchange means are opened between the reactors $R_1,R'_1$, $R_3,R'_3$ and $R_2,R'_2$, thereby causing the regeneration of the installation.

6. The method for producing cold as claimed in claim 3, which is put into practice in an installation which comprises three HP, LP and IP assemblies respectively comprising the reactors $R_1,R'_1$, $R_3,R'_3$ and $R_2,R'_2$ under the following conditions:

during a preliminary step,
the gas exchange means are closed between the reactors $R_1,R'_1$, $R_3,R'_3$ and $R_2,R'_2$, the respective sorbents and gases selected are introduced into the reactors so that the reactors $R_1$ and $R_2$ contain their respective sorbent in a form rich in gas (B1,G1) and (B2,G2), the reactors $R'_1$ and $R'_2$ are in a state to consume the respective gas G1 and G2, the reactor $R_3$ contains the sorbent in a form poor in gas B3, and the reactor $R'_3$ is in a state to supply the gas, during step a) in a first phase, the gas exchange means are opened between the reactors $R_3,R'_3$ on the one hand and between the reactors $R_2,R'_2$ on the other, thereby producing cold in $R'_3$; in a second phase, the gas exchange means are opened between the reactors $R_1,R'_1$ on the one hand and the reactors $R_2,R'_2$ on the other, thereby producing cold in $R'_2$, during step b), heat energy is supplied to $R'_1$ to raise it to a temperature higher than the normal temperature, the gas transfer means are then opened between the reactors $R_1,R'_1$ on the one hand and the reactors $R_3,R'_3$ on the other, thereby regenerating the installation.

7. The method for producing cold as claimed in claim 3, which is put into practice in an installation which comprises three HP, LP and IP assemblies respectively comprising the reactors $R_1,R'_1$, $R_3,R'_3$ and $R_2,R'_2$, under the following conditions:

during a preliminary step,
the gas exchange means are closed between the reactors $R_1,R'_1$, $R_3,R'_3$ and $R_2,R'_2$, the respective sorbents and gases selected are introduced into the reactors $R_i$ and the reactors $R'_i$ so that the reactors $R_1$ and $R_2$ contain their respective sorbent in a form rich in gas (B1,G1) and (B2,G2), the reactors $R'_1$ and $R'_2$ are in a state to consume the respective gas G1 and G2, the reactor $R_3$ contains the sorbent in a form poor in gas B3 and the reactor $R'_3$ is in a state to supply the gas, during step a) the gas transfer means are opened between the reactors $R_3,R'_3$ on the one hand and the reactors $R_1,R'_1$ on the other, thereby producing cold in $R'_3$, during step b), in a first phase, heat energy is added to $R'_1$ and communication is created between reactors $R_1,R'_1$ on the one hand and the reactors $R_2,R'_2$ on the other; in a second phase, heat energy is added to $R'_2$, a connection is created between the reactors $R_2,R'_2$ on the one hand and the reactors $R_3,R'_3$ on the other, thereby causing the regeneration of the installation.

8. The method as claimed in claim 1 for producing heat at a temperature higher than that of a heat energy source, wherein, during step a) of production, heat energy is added to the installation by the reactor $R'_3$, and possibly by the reactor $R'_2$, before opening the gas exchange means between the reactors $R_3$ and $R'_3$ and possibly between the reactors $R_2$ and $R'_2$.

9. The method as claimed in claim 8 for producing heat at a given place using heat energy sources located at another place, wherein the heat source used for the regeneration step b) is the exergy of the heat produced at elevated temperature during step a).

10. The method for producing heat as claimed in claim 8, which is put into practice in an installation which comprises an HP assembly comprising the reactors $R_1$ and $R'_1$ and an LP assembly comprising the reactors $R_3$ and $R'_3$, under the following conditions:

during a preliminary step,
the gas transfer means between $R_1$ and $R'_1$ on the one hand, between $R_3$ and $R'_3$ on the other, are closed,
the respective sorbents and gases are introduced into the reactors so that the reactor $R_1$ of the HP assembly contains the sorbent in a form rich in gas (B1,G1), the reactor $R'_1$ is in a state to consume the gas G1, the reactor $R_3$ of the LP assembly contains the sorbent in a form poor in gas B3, and the corresponding reactor $R'_3$ is in a state to supply gas G3, during step a), heat energy is added to $R'_3$ to raise it to a temperature higher than the normal temperature, the gas transfer means are then opened between the reactors $R_3$ and $R'_3$ on the one hand, and the reactors $R_1$ and $R'_1$ on the other, thereby causing the production of heat in $R'_1$, during step b), heat energy is added to $R'_1$ to raise it to a temperature higher than the normal temperature, the gas transfer means are then opened between the reactors $R_3$ and $R'_3$ on the one hand, and the reactors $R_1$ and $R'_1$, thereby causing the regeneration of the installation.

11. The method for producing heat as claimed in claim 8, which is put into practice in an installation which comprises three HP, LP and IP assemblies respectively comprising the reactors $R_1,R'_1$, $R_3,R'_3$ and $R_2,R'_2$, under the following conditions:

during a preliminary step,
the gas exchange means are closed between the reactors $R_1,R'_1$, $R_3,R'_3$ and $R_2,R'_2$, the respective sorbents and gases selected are introduced into the reactors so that the reactor $R_1$ contains the sorbent in a form rich in gas (B1,G1), the reactor $R'_1$ is in a state to consume the gas G1, the reactors $R_3$ and $R_2$ contain their respective sorbent in a form poor in gas B3 and B2, and the reactors $R'_3$ and $R'_2$ are in a state to supply the respective gas G3 and G2, during step a), heat energy is added to $R'_3$ and $R'_2$ to raise them to a temperature higher than the ambient temperature, the gas exchange means are then opened between the reactors $R_3,R'_3$, the reactors $R_2,R'_2$, and the reactors $R_1,R'_1$, thereby causing the production of heat in $R'_1$, during step b), heat energy is added to $R'_1$ to raise it to a temperature higher than the normal temperature, the gas transfer means are then opened between the reactors $R_3,R'_3$, the reactors $R_2,R'_2$ and the reactors $R_1,R'_1$, thereby causing the regeneration of the system.

12. The method for producing heat as claimed in claim 8 which is put into practice in an installation which comprises three HP, LP and IP assemblies respectively comprising the reactors $R_1,R'_1$, $R_3,R'_3$ and $R_2,R'_2$, under the following conditions:

during a preliminary step:
the gas transfer means are closed between the different reactors,
the respective sorbents and gases are introduced into the reactors, at normal temperature, so that $R_1$ and $R_2$ contain their respective sorbent in the state rich in gas (S1,G1) and (S2,G2), $R_3$ contains the sorbent in the state poor in gas, $R'_1$ and $R'_2$ are in a state to consume the gas G1 and the gas G2 respectively, and $R'_3$ is in a state to liberate the gas G3, during step a), heat energy is added to $R'_3$, the gas transfer means are then opened between the reactors $R_3,R'_3$ on the one hand and the reactors $R_1,R'_1$ on the other, thereby causing the production of heat in $R'_1$, during step b), in a first phase, heat energy is added to $R'_1$, the gas transfer means are then opened between the reactors $R_1,R'_1$ on the one hand and the reactors $R_2,R'_2$ on the other; in a second phase, heat energy is added to $R'_2$, the gas transfer means are then opened between the reactors $R_2,R'_2$ on the one hand and the reactors $R_3,R'_3$ on the other, thereby causing the regeneration of the system.

13. The method for producing heat as claimed in claim 8, which is put into practice in an installation which comprises three HP, LP and IP assemblies respectively comprising the reactors $R_1,R'_1$, $R_3,R'_3$ and $R_2,R'_2$, under the following conditions:

during a preliminary step,
the gas transfer means are closed between the different reactors,
the respective sorbents and gases are introduced into the reactors, at normal temperature, so that $R_2$ contains the sorbent in a state rich in gas (S2,G2), $R_3$ and $R_1$ contain their sorbent in a state poor in gas respectively B3 and B1, $R'_2$ is in a state to consume the gas G2, and $R'_3$ and $R'_1$ are in a state to liberate the gas G3 and G2 respectively, during step a) in a first phase, heat energy is added to $R'_3$, a connection is created between the reactors $R_3,R'_3$ on the one hand, and the reactors $R_2,R'_2$ on the other, thereby causing the production of heat in $R'_2$; in a second phase, heat energy is added to $R'_2$, a connection is created between the reactors $R_1,R'_1$ on the one hand, and the reactors $R_2,R'_2$ on the other, thereby causing the production of heat in $R'_1$, during step b), heat energy is added to $R'_1$, the gas transfer means are then opened between the reactors $R_1,R'_1$ on the one hand and the reactors $R_3,R'_3$ on the other, thereby causing the regeneration of the installation.

14. The method as claimed in claim 1, wherein the reversible process in the reactors $R'_i$ is a liquid/gas phase change, an adsorption of a gas in a solid, an absorption of a gas in a liquid, a chemical reaction between a gas and a solid or a liquid, or the formation of clathrate hydrates.

15. The method as claimed in claim 1, wherein the reversible process in the reactors $R_i$ is an adsorption of a gas in a solid, an absorption of a gas in a liquid, a chemical reaction between a gas and a solid or a liquid, or the formation of clathrate hydrates.

16. The method as claimed in claim 1, wherein the reversible processes in all the assemblies of the installation involve the same gas.

17. An installation for producing cold and/or heat, which comprises an HP assembly comprising the reactors $R_1$ and $R'_1$, an LP assembly comprising the reactors $R_3$ and $R'_3$ and possibly an IP assembly comprising reactors $R_2$ and $R'_2$, wherein:

each reactor $R_i$ is the seat of a reversible sorption alternatively producing and consuming the gas $G_i$,
each reactor $R'_i$ is the seat of a reversible process alternatively producing and consuming the gas $G_i$,
the reactants in the reactors are selected so that, at a given pressure: the equilibrium temperature of the sorption in the reactor $R_i$ of an assembly is higher than the equilibrium temperature of the reversible process in the reactor $R'_i$ of the same assembly, the equilibrium temperature of the sorption in the reactor $R_1$ is lower than that in $R_3$, and if applicable, the equilibrium temperature of the sorption in $R_2$ is between the equilibrium temperatures in $R_1$ and $R_3$,
the reactors $R_i$ and $R'_i$ of an assembly are equipped with means to exchange the gas $G_i$,
the reactors $R_1,R_3$ and if applicable $R_2$ are equipped with means to exchange heat between each other,
the reactors are isolated from atmospheric pressure.

18. The method as claimed in claim 2, for producing cold at a given place using thermal energy sources located at another place, wherein:

the respective gases and sorbents in the LP assembly (or the LP and IP assemblies) are selected so that, at the respective pressure which occurs in $R'_3$ (or in $R'_3$ and $R'_2$) after opening of the gas exchange means in the reactors, the equilibrium temperature of the reversible process in $R'_3$ (or in $R'_3$ and $R'_2$) corresponds to the temperature at which the production of cold is desired, during the step a) of production, the gas exchange means are opened between the reactors without prior input of heat energy to the reactor $R'_3$ (or to the reactors $R'_3$ and $R'_2$).

19. The method as claimed in claim 2 for producing heat at a temperature higher than that of a heat energy source, wherein, during step a) of production, heat energy is added to the installation by the reactor $R'_3$, and possibly by the reactor $R'_2$, before opening the gas exchange means between the reactors $R_3$ and $R'_3$ and possibly between the reactors $R_2$ and $R'_2$.

20. The method for producing cold as claimed in claim 9, which is put into practice in an installation which comprises three HP assembly comprising the reactors $R_1$ and $R'_1$ and an LP assembly comprising the reactors $R_3$ and $R'_3$, under the following conditions:

during a preliminary step, the gas transfer means between $R_1$ and $R'_1$ on the one hand, between $R_3$ and $R'_3$ on the other, are closed, the respective sorbents and gases are introduced into the reactors so that the reactor $R_1$ of the HP assembly contains the sorbent in a form rich in gas (B1,G1), the reactor $R'_1$ is in a state to consume the gas G1, the reactor $R_3$ of the LP assembly contains the sorbent in a form poor in gas B3, and the corresponding reactor $R'_3$ is in a state to supply gas G3, during step a), heat energy is added to $R'_3$ to raise it to a temperature higher than the normal temperature, the gas transfer means are then opened between the reactors $R_3$ and $R'_3$ on the one hand, and the reactors $R_1$ and $R'_1$, on the other, thereby causing the production of heat in $R'_1$, during step b), heat energy is added to $R'_1$ to raise it to a temperature higher than the normal temperature, the gas transfer means are then opened between the reactors $R_3$ and $R'_3$ on the one hand, and the reactors $R_1$ and $R'_1$, thereby causing the regeneration of the installation.

21. The method for producing heat as claimed in claim 9, which is put into practice in an installation which comprises three HP, LP and IP assemblies respectively comprising the reactors $R_1,R'_1$, $R_3,R'_3$ and $R_2,R'_2$, under the following conditions:

during a preliminary step, the gas exchange means are closed between the reactors $R_1,R'_1$, $R_3,R'_3$ and $R_2,R'_2$, the respective sorbents and gases selected are introduced into the reactors so that the reactor $R_1$ contains the sorbent in a form rich in gas (B1,G1), the reactor $R'_1$ is in a state to consume the gas G1, the reactors $R_3$ and $R_2$ contain their respective sorbent in a form poor in gas B3 and B2, and the reactors $R'_3$ and $R'_2$ are in a state to supply the respective gas G3 and G2, during step a), heat energy is added to $R'_3$ and $R'_2$ to raise them to a temperature higher than the ambient temperature, the gas exchange means are then opened between the reactors $R_3,R'_3$, the reactors $R_2,R'_2$, and the reactors $R_1,R'_1$, thereby causing the production of heat in $R'_1$, during step b), heat energy is added to $R'_1$ to raise it to a temperature higher than the normal temperature, the gas transfer means are then opened between the reactors $R_3,R'_3$, the reactors $R_2,R'_2$ and the reactors $R_1,R'_1$, thereby causing the regeneration of the system.

22. The method for producing heat as claimed in claim 9, which is put into practice in an installation which comprises three HP, LP and IP assemblies respectively comprising the reactors $R_1,R'_1$, $R_3,R'_3$ and $R_2,R'_2$, under the following conditions:

during a preliminary step:

the gas transfer means are closed between the different reactors, the respective sorbents and gases are introduced into the reactors, at normal temperature, so that $R_1$ and $R_2$ contain their respective sorbent in the state rich in gas (S1,G1) and (S2,G2), $R_3$ contains the sorbent in the state poor in gas, $R'_1$ and $R'_2$ are in a state to consume the gas G1 and the gas G2 respectively, and $R'_3$ is in a state to liberate the gas G3, during step a), heat energy is added to $R'_3$, the gas transfer means are then opened between the reactors $R_3,R'_3$ on the one hand and the reactors $R_1,R'_1$ on the other, thereby causing the production of heat in $R'_1$, during step b), in a first phase, heat energy is added to $R'_1$, the gas transfer means are then opened between the reactors $R_1,R'_1$ on the one hand and the reactors $R_2,R'_2$ on the other; in a second phase, heat energy is added to $R'_2$, the gas transfer means are then opened between the reactors $R_2,R'_2$ on the one hand and the reactors $R_3,R'_3$ on the other, thereby causing the regeneration of the system.

23. The method for producing heat as claimed in claim 9, which is put into practice in an installation which comprises three HP, LP and IP assemblies respectively comprising the reactors $R_1,R'_1$, $R_3,R'_3$ and $R_2,R'_2$, under the following conditions:

during a preliminary step, the gas transfer means are closed between the different reactors, the respective sorbents and gases are introduced into the reactors, at normal temperature, so that $R_2$ contains the sorbent in a state rich in gas (S2,G2), $R_3$ and $R_1$ contain their sorbent in a state poor in gas respectively B3 and B1, $R'_2$ is in a state to consume the gas G2, and $R'_3$ and $R'_1$ are in a state to liberate the gas G3 and G2 respectively, during step a) in a first phase, heat energy is added to $R'_3$, a connection is created between the reactors $R_3,R'_3$ on the one hand, and the reactors $R_2,R'_2$ on the other, thereby causing the production of heat in $R'_2$; in a second phase, heat energy is added to $R'_2$, a connection is created between the reactors $R_1,R'_1$ on the one hand, and the reactors $R_2,R'_2$ on the other, thereby causing the production of heat in $R'_1$, during step b), heat energy is added to $R'_1$, the gas transfer means are then opened between the reactors $R_1,R'_1$ on the one hand and the reactors $R_3,R'_3$ on the other, thereby causing the regeneration of the installation.

\* \* \* \* \*